US012533723B2

(12) United States Patent
Matsuno et al.

(10) Patent No.: US 12,533,723 B2
(45) Date of Patent: Jan. 27, 2026

(54) DIE ASSEMBLY AND METHOD FOR PRODUCING BLANK USING THE DIE ASSEMBLY

(71) Applicant: NIPPON STEEL CORPORATION, Tokyo (JP)

(72) Inventors: Takashi Matsuno, Tokyo (JP); Akira Egami, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/422,091

(22) Filed: Jan. 25, 2024

(65) Prior Publication Data

US 2024/0238862 A1 Jul. 18, 2024

Related U.S. Application Data

(60) Division of application No. 16/815,095, filed on Mar. 11, 2020, which is a continuation of application No.
(Continued)

(51) Int. Cl.
*B21D 28/16* (2006.01)
*B21D 28/14* (2006.01)
(Continued)

(52) U.S. Cl.
CPC ............. *B21D 28/16* (2013.01); *B21D 28/14* (2013.01); *B21D 28/34* (2013.01); *B26F 1/14* (2013.01); *B21D 28/26* (2013.01)

(58) Field of Classification Search
CPC ........ B21D 28/14; B21D 28/16; B21D 28/26; B21D 28/34; B26F 1/14; B26F 1/16
See application file for complete search history.

(56) References Cited

U.S. PATENT DOCUMENTS 2,031,024 A * 2/1936 Ahlquist ................ B21D 28/34 470/197
2,212,886 A * 8/1940 Ruland .................. B21D 28/34 72/359
(Continued)

FOREIGN PATENT DOCUMENTS

CN 1031982 6/1996
CN 101274345 10/2008
(Continued)

OTHER PUBLICATIONS

EP-2797703-B1 English Translation; Jul. 6, 2016; Hank Rainer B21D28/34.*
(Continued)

*Primary Examiner* — Laura M Lee
(74) *Attorney, Agent, or Firm* — Millen, White, Zelano & Branigan, P.C.; Christopher W. Brody

(57) ABSTRACT

A sheet-shaped blank (10) for press forming is produced by shearing a metal sheet (30). The blank (10) includes a sheared edge (14), which includes a sheared surface (14*b*) and a fractured surface (14*c*) in the sheet thickness direction and has a loop shape in plan view. In plan view, an edge of the sheared edge (14) includes concavely curved portions (20). The average of lengths of the fractured surface (14*c*) in the sheet thickness direction in the curved portions (20) is greater than the average of lengths of the fractured surface (14*c*) in the sheet thickness direction over the entire perimeter of the sheared edge (14).

3 Claims, 21 Drawing Sheets

Related U.S. Application Data

15/533,737, filed as application No. PCT/JP2014/082767 on Dec. 10, 2014, now Pat. No. 10,625,325.

(51) Int. Cl.

*B21D 28/26* (2006.01)
*B21D 28/34* (2006.01)
*B26F 1/14* (2006.01)

(56) References Cited

U.S. PATENT DOCUMENTS

| | | | | |
|---|---|---|---|---|
| 2,348,875 | A * | 5/1944 | Beard | B21D 22/04 72/335 |
| 3,060,992 | A | 10/1962 | Hopp | |
| 3,656,394 | A | 4/1972 | McCutcheon | |
| 3,724,305 | A | 4/1973 | Kondo | |
| 4,543,865 | A | 10/1985 | Kramski | |
| 5,052,207 | A | 10/1991 | Porucznik | |
| 5,235,881 | A | 8/1993 | Sano | |
| 5,992,280 | A | 11/1999 | Oishi | |
| 6,125,527 | A | 10/2000 | Sunaga | |
| 6,370,931 | B2 | 4/2002 | Bennett | |
| 7,162,907 | B2 | 1/2007 | Joseph | |
| 8,201,433 | B2 * | 6/2012 | Kanie | B21D 28/26 72/350 |
| 9,393,607 | B2 * | 7/2016 | Nordlin | B21D 28/34 |
| 11,224,909 | B2 | 1/2022 | Nishijima | |
| 2001/0042430 | A1 | 11/2001 | Negishi | |
| 2005/0211032 | A1 | 9/2005 | Liu | |
| 2012/0027977 | A1 | 2/2012 | Inoue | |

FOREIGN PATENT DOCUMENTS

| | | | | |
|---|---|---|---|---|
| CN | 201815586 | | 5/2011 | |
| EP | 2 610 019 | | 7/2013 | |
| EP | 2797703 | B1 * | 7/2016 | B21D 28/14 |
| JP | 57170834 | | 10/1982 | |
| JP | 63-174731 | | 7/1988 | |
| JP | 03-057516 | | 3/1991 | |
| JP | 0570896 | | 9/1993 | |
| JP | 07-214191 | | 8/1995 | |
| JP | 2908935 | | 6/1999 | |
| JP | 11226663 | | 8/1999 | |
| JP | 11226663 | A * | 8/1999 | B21D 28/00 |
| JP | 11-330339 | | 11/1999 | |
| JP | 2005-074441 | | 3/2005 | |
| JP | 2005-095980 | | 4/2005 | |
| JP | 2006-231425 | | 9/2006 | |
| JP | 2009-113051 | | 5/2009 | |
| JP | 100575356 | B1 * | 9/2009 | B21D 28/26 |
| JP | 2011-073012 | | 4/2011 | |
| JP | 4989425 | | 8/2012 | |
| JP | 2013059829 | A * | 4/2013 | B26F 1/12 |
| JP | 2014-231094 | | 12/2014 | |
| KR | 10-2014-0026055 | | 3/2014 | |

OTHER PUBLICATIONS

KR-100575356-B1 English Translation; Sep. 10, 2009; Lee, Mi B21D28/26.*

JP-2013059829-A English Translation; Apr. 4, 2013; Abe, M; B26F1/12.*

Zhou, Fine Blanking Handbook, National Defense Industry Press, p. 463-464, Jan. 2006.

Zhang, Stamping Process and Mold Design, Tsinghua University Press, p. 45-46, Mar. 2006.

* cited by examiner

PRIOR ART

[Figure 2]
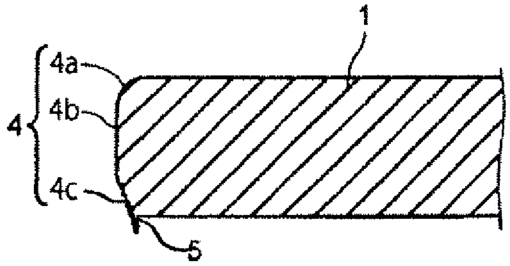
PRIOR ART

[Figure 4]
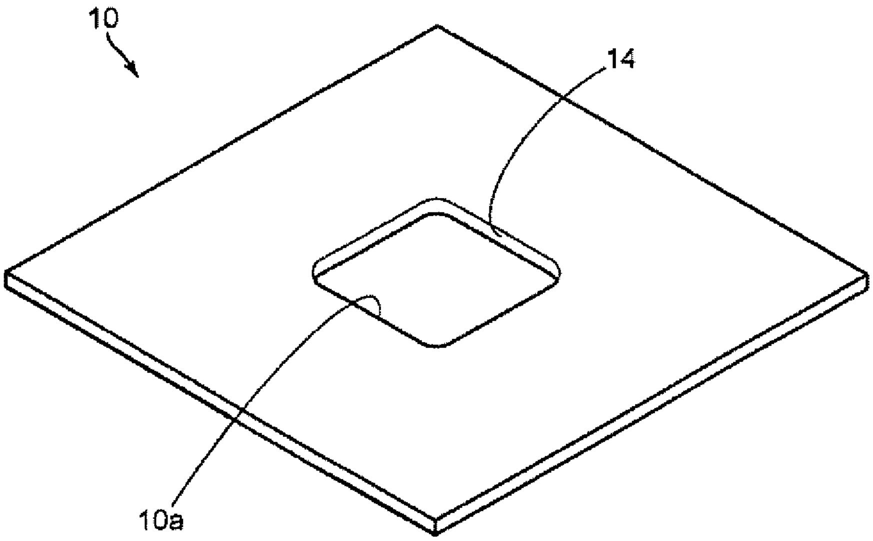
[Figure 5]
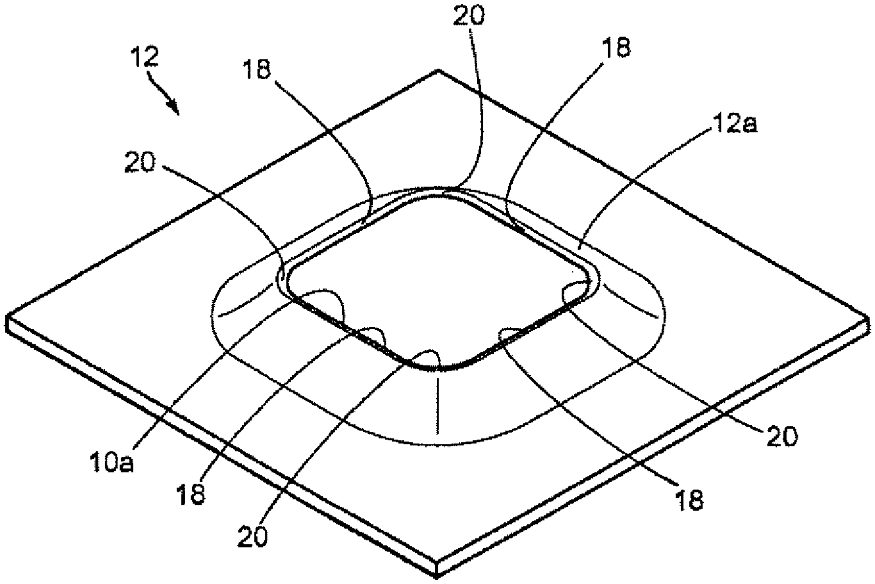

[Figure 7]
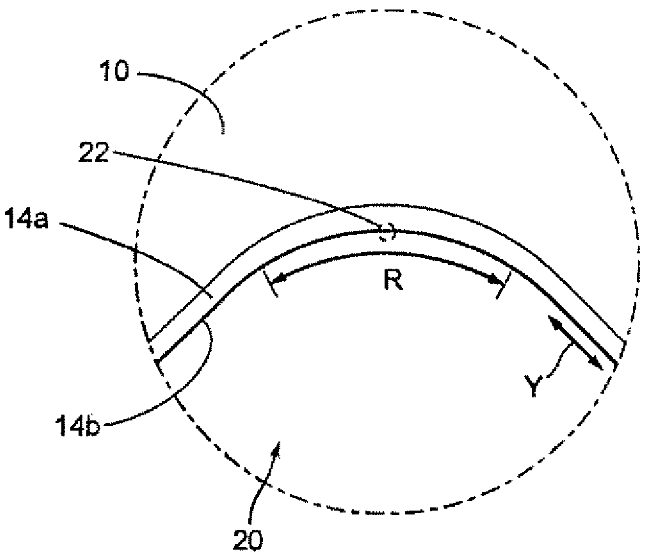

[Figure 8]
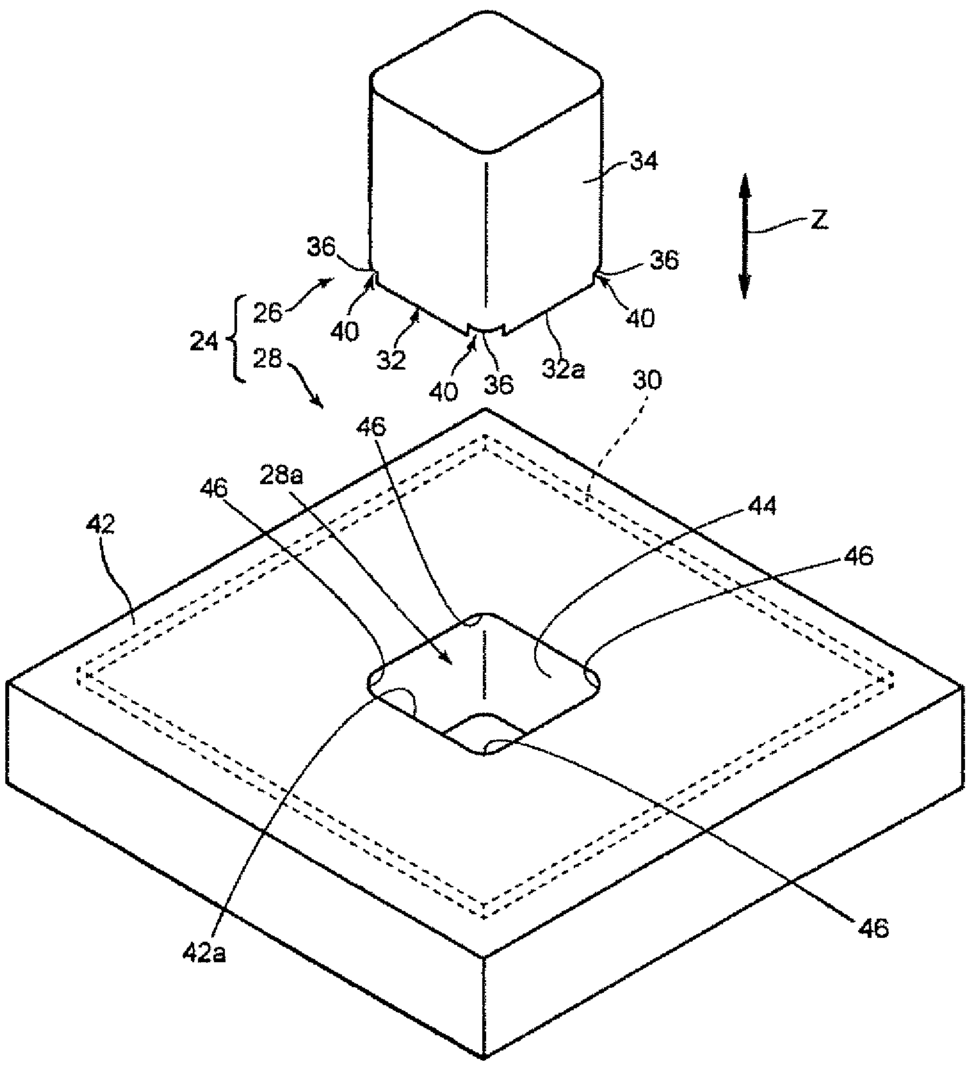

[Figure 9]
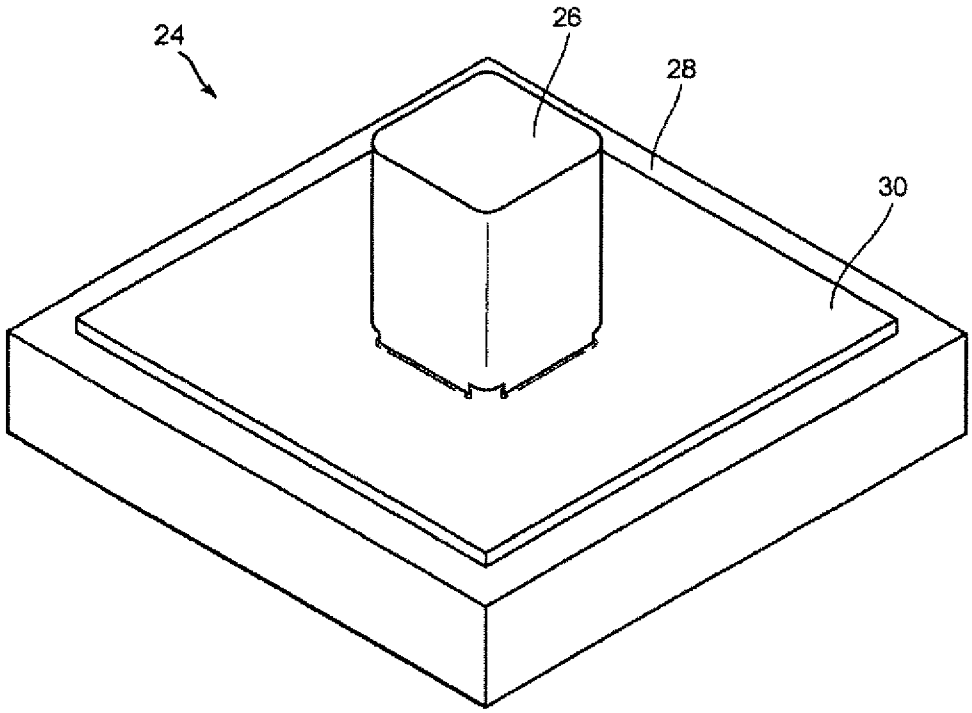

[Figure 17]
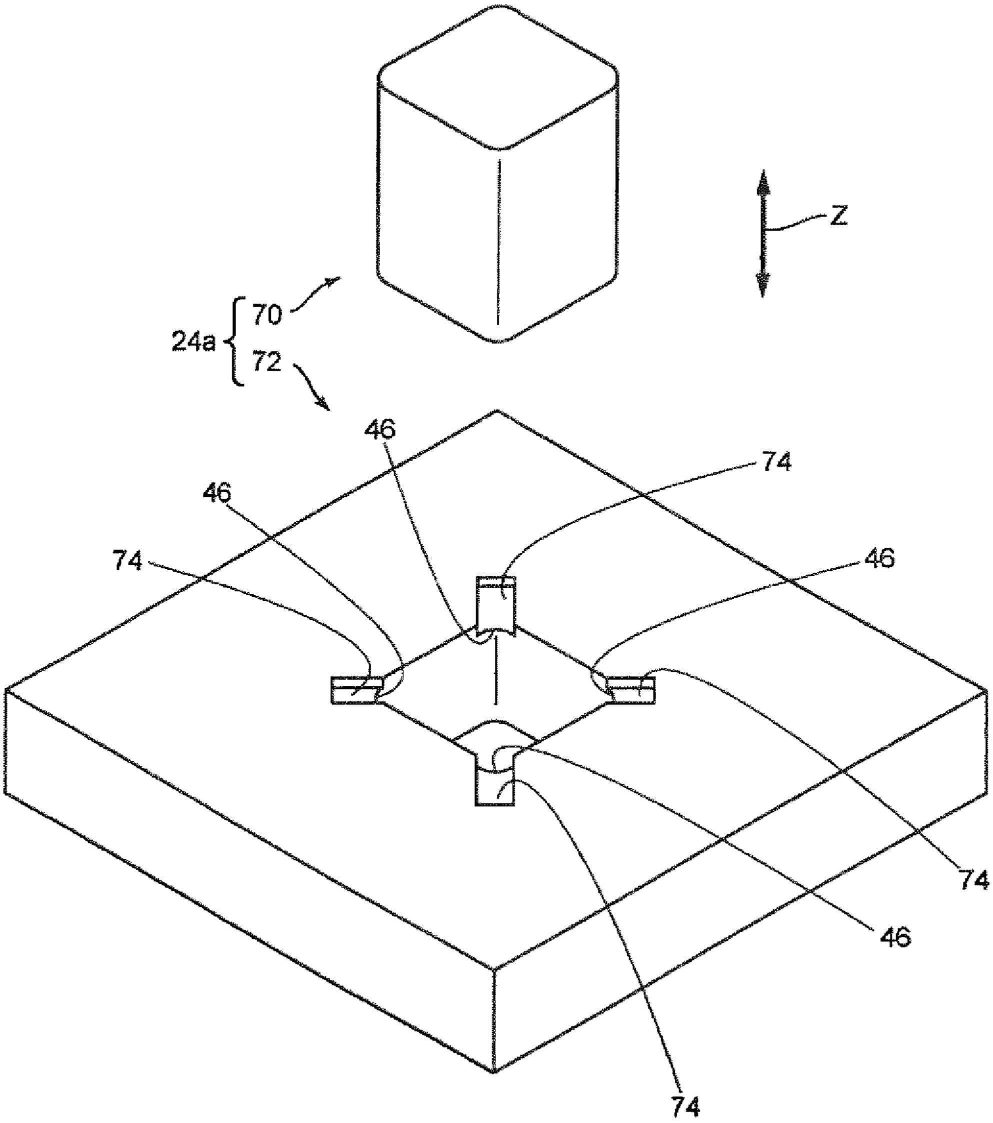

[Figure 18]
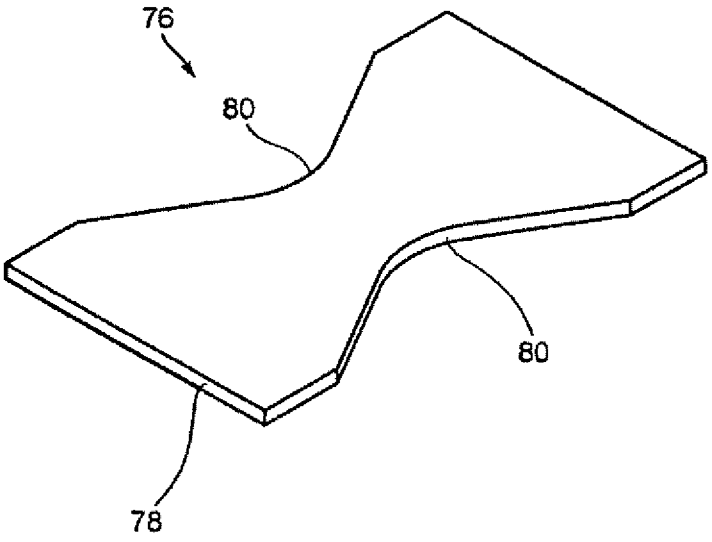

[Figure 19]
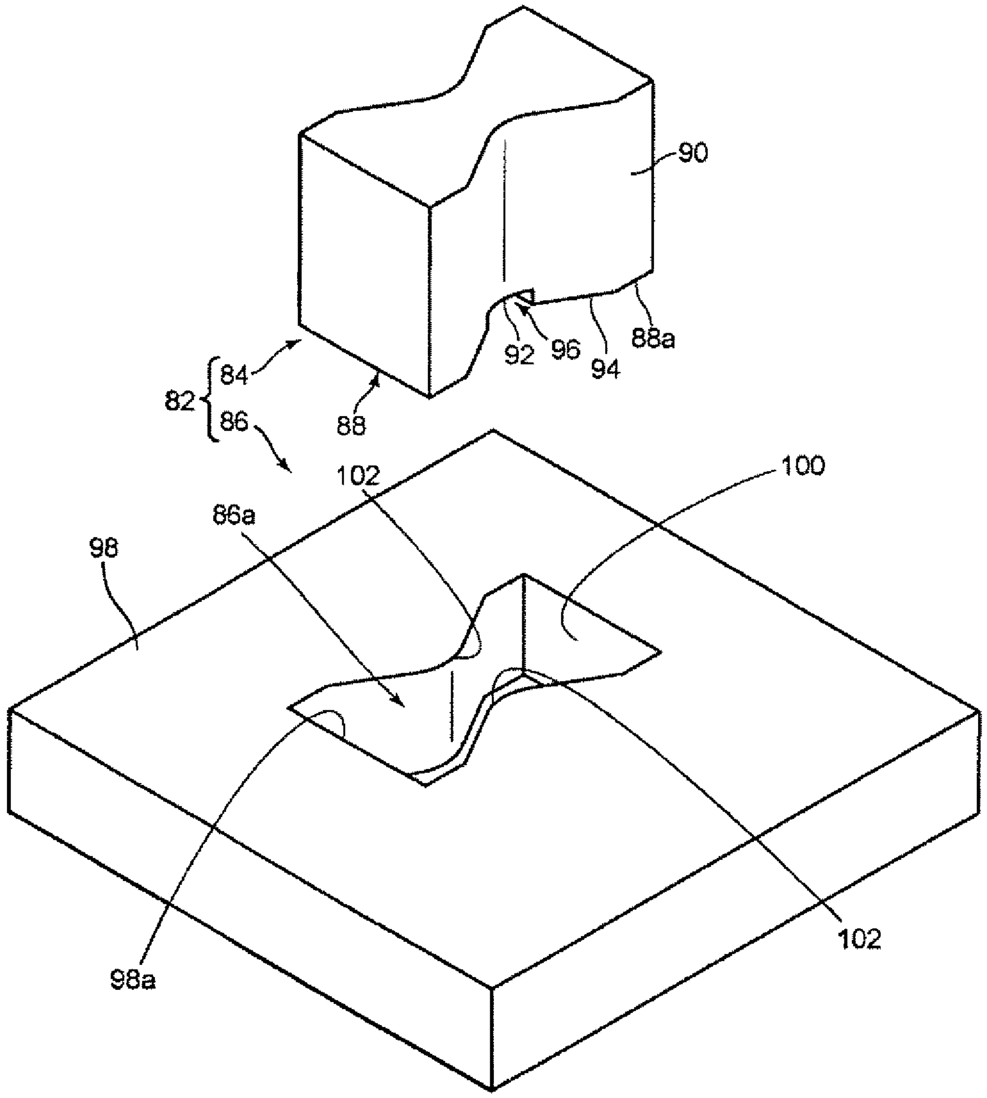

[Figure 20]
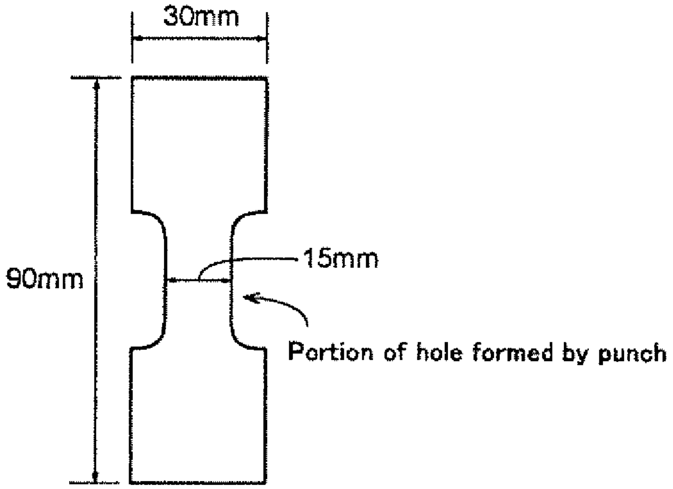
[Figure 21]
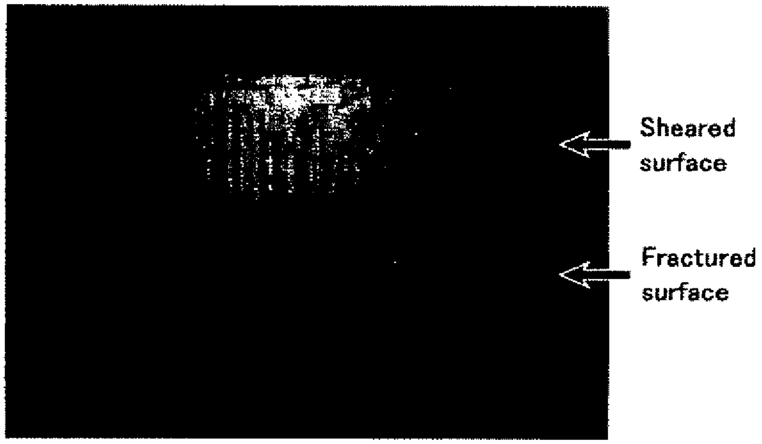

[Figure 22]
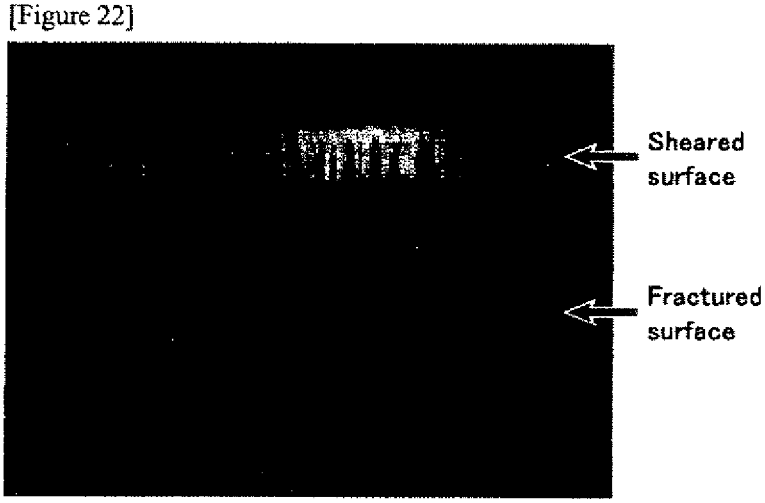

DIE ASSEMBLY AND METHOD FOR PRODUCING BLANK USING THE DIE ASSEMBLY

This application is a Divisional of U.S. Ser. No. 16/815,095 filed on Mar. 11, 2020, which is a Continuation of U.S. Ser. No. 15/533,737 filed on Jun. 7, 2017, which is a national phase of PCT/JP2014/082767 filed on Dec. 10, 2014.

TECHNICAL FIELD

The present invention relates to a blank for press forming, a formed article produced from the blank, a die assembly for producing the blank, and a method for producing the blank.

BACKGROUND ART

When members for use in automobiles, home appliances, or buildings, for example, are to be produced, blanks (materials) are subjected to plastic working such as press forming to be formed into a predetermined shape. When producing the blanks in large volume, shearing for example is employed to cut a metal sheet into a predetermined shape.

FIGS. 1(*a*)-1(*b*) schematically illustrate how a metal sheet is cut by shearing. As illustrated in FIG. 1(*a*), when a metal sheet 1 is to be sheared, firstly the metal sheet 1 is placed on a die 2. Thereafter, as illustrated in FIG. 1(*b*), a punch 3 is moved toward the surface of the metal sheet 1 in a direction approximately perpendicular thereto (direction indicated by an arrow D) to cut the metal sheet 1.

FIG. 2 is a schematic cross-sectional view of an exemplary sheared edge of a metal sheet that has been cut by shearing. As illustrated in FIG. 2, a sheared edge 4 of the metal sheet 1 includes, for example, a shear droop portion 4*a*, a sheared surface 4*b*, and a fractured surface 4*c*. The sheared surface is significantly plastically deformed as a result of the shearing. In the example illustrated in FIG. 2, a burr 5 has been formed on the back side of the metal sheet 1 as a result of the shearing.

As described above, sheared edges include a sheared surface, which is significantly plastically deformed as a result of shearing. Thus, sheared edges cannot easily stretch and deform compared with worked surfaces formed by machining and grinding, and therefore sheared edges are more likely to have stretch flange cracking (cracking that occurs in the worked surface when the worked surface stretches during press forming, which follows the process of shearing, machining, or another process). In the following, stretch flange cracking will be described with reference to the drawings.

FIG. 3 presents diagrams for illustrating stretch flanging. FIG. 3(*a*) is a perspective view of a metal sheet before being subjected to stretch flanging, and FIGS. 3(*b*) and 3(*c*) are perspective views of the metal sheet after being subjected to the stretch flanging.

Referring to FIG. 3(*a*), the metal sheet 6 has been cut by shearing and a sheared edge 6*a* has been formed along the outer perimeter edge. The outer perimeter edge of the metal sheet 6 includes a recess 6*b*, which has an approximately L-shaped perimeter edge in plan view. The perimeter edge of the recess 6*b* includes a straight portion 6*c*, a curved portion 6*d*, and a straight portion 6*e*. In FIG. 3(*a*), a length X1, a length Y1, and a length Z1 represent the lengths of the straight portion 6*c*, the curved portion 6*d*, and the straight portion 6*e*, respectively.

Referring to FIGS. 3(*a*) and 3(*b*), in the case where stretch flanging is applied to a perimeter edge area of the recess 6*b* in such a manner as to cause out-of-plane deformation, the lengths X1, Z1 of the straight portion 6*c* and straight portion 6*e* do not change, whereas the length of the curved portion 6*d* changes to a length Y2, which is greater than the length Y1. That is, the sheared edge 6*a* stretches and deforms in the curved portion 6*d*. This may result in the occurrence of stretch flange cracking in the curved portion 6*d*.

Referring to FIGS. 3(*a*) and 3(*c*), in the case where stretch flanging is applied to a perimeter edge area of the recess 6*b* in such a manner as to cause in-plane deformation, the lengths X1, Z1 of the straight portion 6*c* and the straight portion 6*e* do not change (or substantially do not change), whereas the length of the curved portion 6*d* changes to a length Y3, which is greater than the length Y1. That is, the sheared edge 6*a* stretches and deforms in the curved portion 6*d*. This may result in the occurrence of stretch flange cracking in the curved portion 6*d*.

The occurrence of stretch flange cracking as described above poses problems particularly when producing home appliance parts or automotive parts, which are of various types, by press forming. In recent years, there has been a need for further weight reduction of parts such as those mentioned above, and therefore thin steel sheets having a strength greater than or equal to that of 780 MPa class steel sheets are frequently used. Thus, suppression of the occurrence of stretch flange cracking is desired particularly when high strength steel sheets such as those mentioned above are subjected to press forming. However, it is known that stretch flange cracking occurs even in a low strength steel sheet, and therefore prevention of stretch flange cracking is necessary regardless of the strength of the steel sheet. Thus, many techniques have been proposed heretofore for suppressing the occurrence of stretch flange cracking in a sheared edge.

For example, Patent Document 1 discloses a punching tool in which the punch includes a projecting bending blade at the tip of the cutting edge. When a workpiece is cut using the punch having such a configuration, the bending blade can apply tensile stress to the portion to be cut by the cutting edge. Then, the tensile stress can facilitate propagation of cracks that have been formed in the workpiece by the cutting edge and the die shoulder. This allows the workpiece to be cut by the cutting edge without undergoing compression, and consequently the hole expandability of the punched hole is improved. As a result, it is believed that the occurrence of stretch flange cracking in the sheared edge can be suppressed.

Patent Document 2 discloses a shear blade that includes a main shear blade and an end portion protrusion protruding in the blade advancing direction relative to the main shear blade. When a workpiece sheet is cut using the shear blade having such a configuration, the end portion protrusion can apply tensile stress to the portion to be cut by the main shear blade. As a result, the shear blade of Patent Document 2 achieves advantageous effects similar to those of the punch of Patent Document 1.

LIST OF PRIOR ART DOCUMENTS

Patent Document

Patent Document 1: JP2005-095980A
Patent Document 2: JP2006-231425A

SUMMARY OF INVENTION

Technical Problem

As described above, the techniques disclosed in Patent Documents 1 and 2 are effective in suppressing stretch flange cracking. However, various studies by the present inventors have revealed that workpieces cut using the technique of Patent Document 1 or 2 tend to experience fatigue failure, with areas other than the area to which stretch flanging is applied acting as initiation sites. Specifically, workpieces cut using the technique of Patent Literature 1 or 2 have a greater proportion of fractured surface in their sheared edges. In general, fractured surfaces have numerous cracks. Various studies by the present inventors have revealed that the likelihood of fatigue failure increases with the cracks formed in the fractured surface acting as initiation sites. Thus, workpieces cut using the technique of Patent Document 1 or 2 have the problem of decreased fatigue strength.

An object of the present invention is to provide blanks in which the occurrence of stretch flange cracking during press forming is suppressed and a decrease in fatigue strength is suppressed, press-formed articles produced by press forming the blanks, die assemblies for producing the blanks, and methods for producing the blanks.

Solution to Problem (1) A blank according to an embodiment of the present invention is a sheet-shaped blank for press forming produced by shearing a metal sheet, the blank including: a sheared edge including, in a sheet thickness direction, a sheared surface and a fractured surface, wherein the sheared edge has a loop shape in plan view, the sheared edge has an edge including, in plan view, a curved portion that is concavely curved, and an average of lengths of the fractured surface in the sheet thickness direction in the curved portion is greater than an average of lengths of the fractured surface in the sheet thickness direction over an entire perimeter of the sheared edge.

In this blank, the length of the fractured surface in the sheet thickness direction is greater in the curved portion. In other words, the sheared surface occupies a smaller fraction in the portion, which tends to stretch and deform during press forming. As a result, the curved portion can easily stretch and deform, and therefore the occurrence of stretch flange cracking is suppressed in the curved portion when the curved portion is stretch flanged. Furthermore, in the areas other than the curved portion, the fractured surface occupies a smaller fraction than in the curved portion. In other words, the sheared surface, which is work hardened, occupies a larger fraction. As a result, sufficient fatigue strength is exhibited in the areas other than the curved portion. On the other hand, in the curved portion, the fractured surface occupies a larger fraction. Thus, in its condition before press forming, the curved portion has reduced fatigue strength. However, during press forming, the curved portion is work hardened by stretch flanging and therefore is increased in fatigue strength. As a result of these, the occurrence of stretch flange cracking is suppressed without decreasing the fatigue strength.

(2) Provided that a reference point of the curved portion is defined as a midpoint of the curved portion in a perimeter direction of the sheared edge or a point where a curvature of the curved portion in plan view is greatest, an average of lengths of the fractured surface in the sheet thickness direction within a region, which extends a predetermined length in the perimeter direction with the reference point as a center, may be greater than the average of lengths of the fractured surface in the sheet thickness direction over the entire perimeter of the sheared edge.

This configuration suppresses the occurrence of stretch flange cracking at a central area (a positional center or an area where the curvature is large) of the curved portion.

(3) The average of lengths of the fractured surface in the sheet thickness direction within the region of the predetermined length may be greater by 10% or more of the sheet thickness than the average of lengths of the fractured surface in the sheet thickness direction over the entire perimeter of the sheared edge.

This configuration sufficiently suppresses the occurrence of stretch flange cracking at the central area of the curved portion.

(4) The sheared edge may further include a shear droop portion positioned, in the sheet thickness direction, opposite from the fractured surface, with the sheared surface interposed therebetween, and an average of lengths of the shear droop portion in the sheet thickness direction within the region of the predetermined length may be 20% or less of the sheet thickness.

The shortened length of the shear droop portion more reliably suppresses the occurrence of stretch flange cracking.

(5) The predetermined length may be a length of 50% of the sheet thickness of the blank.

This configuration more reliably suppresses the occurrence of stretch flange cracking at the central area of the curved portion.

(6) The predetermined length may be a length of 2000% of the sheet thickness. This configuration suppresses the occurrence of stretch flange cracking over a sufficient range within the curved portion.

(7) The region of the predetermined length may be a region where a curvature is 5 $m^{-1}$ or more.

This configuration sufficiently prevents the occurrence of stretch flange cracking even in the curved portion, where larger stretch flanging deformation occurs during press forming.

(8) The metal sheet may have a hole formed by punching and the sheared edge may be formed along an edge of the hole.

This configuration prevents the occurrence of stretch flange cracking at the edge of the hole when stretch flanging is applied to an area around the hole formed by punching. In addition, a decrease in fatigue strength around the hole is suppressed.

(9) The metal sheet may have an outer perimeter edge formed by blanking, and the sheared edge may be formed along the outer perimeter edge.

This configuration prevents the occurrence of stretch flange cracking at the outer perimeter edge when stretch flanging is applied to the outer perimeter edge by blanking. In addition, a decrease in fatigue strength around the outer perimeter edge is suppressed.

(10) The curved portion may be configured to stretch and deform during press forming.

This configuration prevents the occurrence of stretch flange cracking in areas that stretch and deform, and reliably prevents a decrease in fatigue strength in the remaining areas.

(11) A formed article according to another embodiment of the present invention is made of the blank described above, the blank having been subjected to press forming. This formed article is prevented from stretch flange cracking and has sufficient fatigue strength.

(12) A die assembly according to another embodiment of the present invention includes a columnar punch and a hollow die configured to receive the punch, the die assembly being configured to shear a metal sheet placed on the die by moving the punch in a predetermined direction, the punch having a bottom surface and an outer perimeter surface, the bottom surface including a cutting edge constituted by an outer perimeter edge of the bottom surface, the outer perimeter surface extending from the outer perimeter edge in a direction parallel to the predetermined direction, the outer perimeter edge including, in plan view, a curved portion that is convexly curved or concavely curved, the bottom surface including a planar portion and a cutout portion recessed with respect to the planar portion in the predetermined direction and configured to include the curved portion in plan view.

Shearing (punching or blanking) of a metal sheet using the die assembly is performed, for example, by forcing the bottom surface of the punch into the metal sheet placed on the die. This brings, firstly, the outer edge of the planar portion and the front surface of the metal sheet into contact with each other, so that a sheared surface is formed in the metal sheet at the contact region. Also, in the contact region between the die and the back surface of the metal sheet, a sheared surface is formed in the metal sheet at the area facing the outer edge of the planar portion. While the amount of forcing of the punch is still small, the area facing the cutout portion, in the front surface of the metal sheet, is not yet in contact with the punch, and therefore the sheared surface has not yet been formed on the area. Also, in the contact region between the die and the back surface of the metal sheet, the area located below the cutout portion has not yet received a large force, and therefore on the area as well, the sheared surface has not yet been formed.

When the punch is further forced inward, cracks occur in the front surface of the metal sheet at the area in contact with the outer edge of the planar portion. The cracks propagate in the sheet thickness direction and consequently the fractured surface is formed on the front side of the metal sheet. Also, in the contact region between the die and the back surface of the metal sheet, cracks occur in the metal sheet at the area facing the outer edge of the planar portion. The cracks propagate in the sheet thickness direction and consequently the fractured surface is formed on the back side of the metal sheet. The cutout portion also comes into contact with the front surface of the metal sheet, so that the sheared surface is formed at the contact region. Also, in the contact region between the die and the back surface of the metal sheet, the sheared surface is formed in the metal sheet at the area located below the cutout portion.

When the punch is further forced inward, the cracks that occurred on the front side and the back side of the metal sheet propagate not only in the sheet thickness direction but also toward the area located below the cutout portion in the metal sheet. As a result, the fractured surface is also formed in the area located below the cutout portion in the metal sheet. That is, before the cutout portion is forced deeply into the metal sheet, the fractured surface is formed at the area located below the cutout portion. As a result, the length of the fractured surface in the sheet thickness direction in the area below the cutout portion is greater than the lengths of the fractured surface in the sheet thickness direction in the other areas.

As described above, in the metal sheet sheared by the punch according to the present invention, the length of the fractured surface in the sheet thickness direction is greater in the area cut by the cutout portion. Thus, by cutting the area that will undergo stretch flanging deformation during press forming via the cutout portion, stretch flange cracking is prevented. In addition, in the area cut by the planar portion, the length of the fractured surface in the sheet thickness direction is shorter and therefore a decrease in fatigue strength is suppressed.

(13) A die assembly according to still another embodiment of the present invention includes a columnar punch and a hollow die configured to receive the punch, the die assembly being configured to shear a metal sheet placed on the die by moving the punch in a predetermined direction, the die having a hollow support surface and an inner perimeter surface, the support surface being configured to support the metal sheet and including a cutting edge constituted by an inner perimeter edge of the die, the inner perimeter surface extending from the inner perimeter edge in a direction parallel to the predetermined direction, the inner perimeter edge including, in plan view, a curved portion that is convexly curved or concavely curved, the support surface including a planar portion and a cutout portion recessed with respect to the planar portion in the predetermined direction and configured to include the curved portion in plan view.

In this die assembly, the cutout portion is provided in the die. This configuration produces advantageous effects similar to those of the die assembly described above in which the punch includes the cutout portion.

(14) A cutout depth of the cutout portion in a direction parallel to the predetermined direction may be 0.1 times or more a sheet thickness of the metal sheet and 0.7 times or less the sheet thickness.

This configuration makes it possible to appropriately delay the time at which the cutout portion begins pressing the metal sheet relative to the time at which the planar portion begins pressing the metal sheet. As a result, in the area cut by the cutout portion, the length of the fractured surface in the sheet thickness direction is appropriately sized.

(15) A method for producing a blank according to another embodiment of the present invention is a method for producing a blank for press forming, the method using the die assembly described above, the method including the steps of: placing a metal sheet on the die of the die assembly, and shearing the metal sheet on the die using the punch of the die assembly.

In blanks produced by the production method described above, the length of the fractured surface in the sheet thickness direction is large in the area cut by the cutout portion of the punch or the die. Thus, by cutting the area that will undergo stretch flanging deformation during press forming via the cutout portion, stretch flange cracking is prevented. Moreover, in the area cut by the planar portion of the punch or the die, the length of the fractured surface in the sheet thickness direction is short and therefore a decrease in fatigue strength is prevented.

(16) A method for producing the blank according to still another embodiment of the present invention is a method for producing a blank according to an embodiment of the present invention using the die assembly described above, the method including the steps of: placing a metal sheet on the die of the die assembly, and shearing the metal sheet on the die using the punch of the die assembly, wherein, in the step of shearing, at least a portion of the curved portion of the blank is formed by cutting a portion of the metal sheet via the cutout portion of the punch or the cutout portion of the die.

The production method described above enables appropriate production of blanks according to embodiments of the present invention.

Advantageous Effects of Invention

The present invention provides blanks in which the occurrence of stretch flange cracking during press forming is suppressed without decreasing the fatigue strength after the press forming.

BRIEF DESCRIPTION OF DRAWINGS

FIG. 2 is a schematic cross-sectional view of an exemplary sheared edge of a metal sheet that has been cut by shearing.

FIG. 3(*b*) is a perspective view of one type of metal sheet after being subjected to stretch flanging.

FIG. 3(*c*) is a perspective view of another type of metal sheet after being subjected to the stretch flanging.

FIG. 4 is a schematic perspective view of a blank according to an embodiment of the present invention.

FIG. 5 is a schematic perspective view of a formed article according to an embodiment of the present invention.

FIG. 6(*b*) is an enlarged cross-sectional view taken along line A-A in FIG. 6(*a*).

FIG. 7 is an enlarged plan view of a curved portion of the blank.

FIG. 8 is a schematic perspective view of a die assembly according to an embodiment of the present invention.

FIG. 9 is a schematic perspective view of the die assembly according to the embodiment of the present invention.

FIG. 10(*b*) is a bottom plan view of the punch of FIG. 10(*a*).

FIG. 17 is a schematic perspective view of a die assembly according to another embodiment of the present invention.

FIG. 18 is a schematic perspective view of a blank according to another embodiment of the present invention.

FIG. 19 is a schematic perspective view of an exemplary die assembly for producing the blank of FIG. 18.

FIG. 20 is a plan view of a specimen.

FIG. 21 is a photograph of a sheared edge in a stretch flanged area of Comparative Example 1.

FIG. 22 is a photograph of a sheared edge in a stretch flanged area of Example 5.

FIG. 23(*b*) illustrates the shape of a stretch flanged article.

DESCRIPTION OF EMBODIMENTS

Hereinafter, blanks, formed articles, die assemblies, and methods for producing a blank, according to the present invention, will be described with reference to the drawings. There are no particular limitations on the material for blanks according to the present invention. Examples of the material for the blanks include metal materials such as steels. When a steel is used as the material for the blanks, there are no particular limitations on the type of steel. Also, there are no particular limitations on the thickness and strength of the blanks provided that the thickness and strength are sufficient for shearing.

(Configurations of Blank and Formed Article)

FIG. 4 is a schematic perspective view of a blank 10 according to an embodiment of the present invention. Referring to FIG. 4, the sheet-shaped blank 10 has an approximately rectangular shape in plan view and has a hole 10*a* at the center. The hole 10*a* is formed by shearing (punching, for example). Thus, in the present embodiment, the blank 10 has, at the center, a sheared edge that has a loop shape in plan view. In other words, the sheared edge having the loop shape forms the hole 10*a*. Methods for producing the blank 10 will be described later.

The blank 10 is subjected to, for example, press forming (e.g., burring or deep drawing) to be formed into parts for automobiles, home appliances, and others. Specifically, referring to FIG. 4 and FIG. 5, a formed article 12, which includes a flange portion 12*a*, is produced for example by performing stretch flanging on the blank 10 with the hole 10*a* being the center. In the following, the blank 10 will be described more specifically.

Figure 1A:
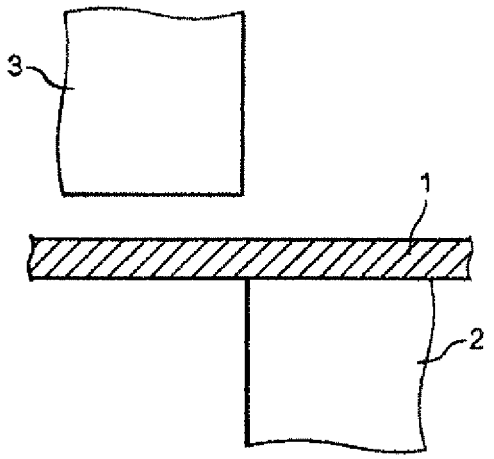
FIGS. 1(*a*)-1(*b*) are diagrams illustrating shearings.
Figure 1B:
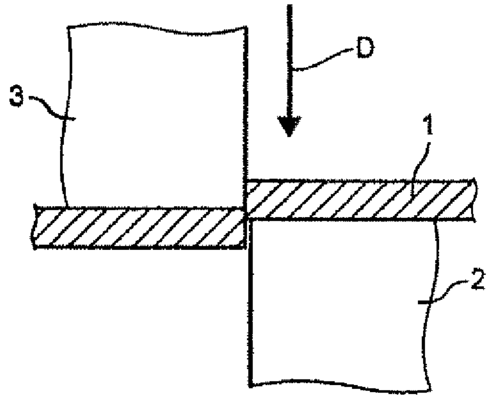
PRIOR ART Figure 1(b)
Figure 3A:
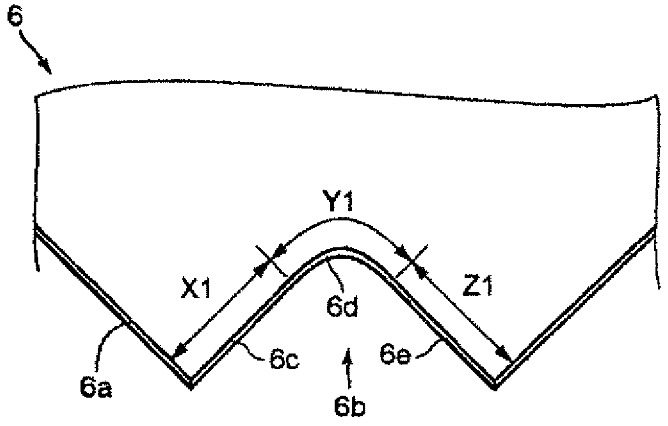
Figure 3(a) PRIOR ART
FIG. 3(*a*) is a perspective view of a metal sheet before being subjected to stretch flanging.
Figure 3B:
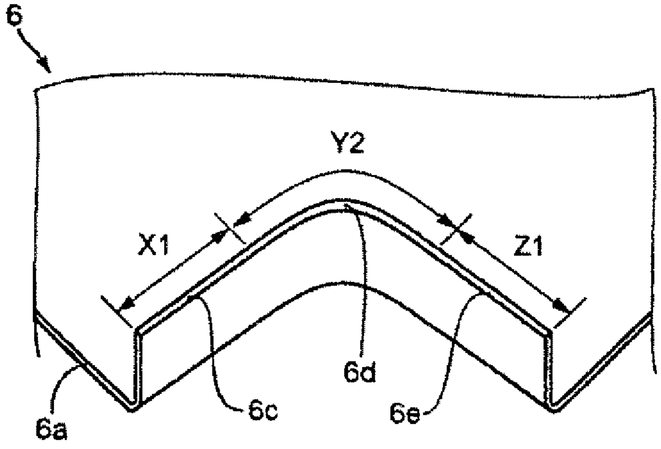
Figure 3(b) PRIOR ART
Figure 3C:
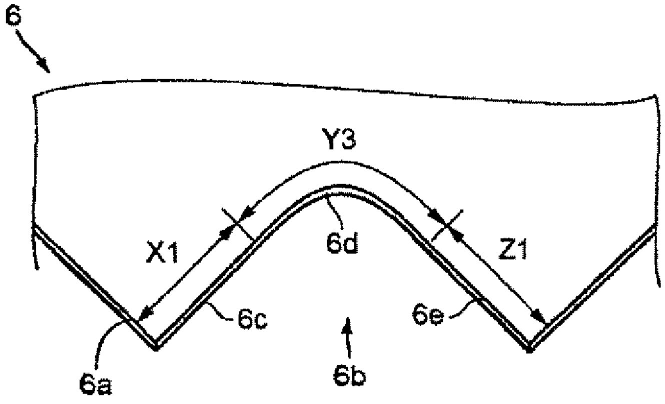
Figure 3(c) PRIOR ART
Figure 6A:
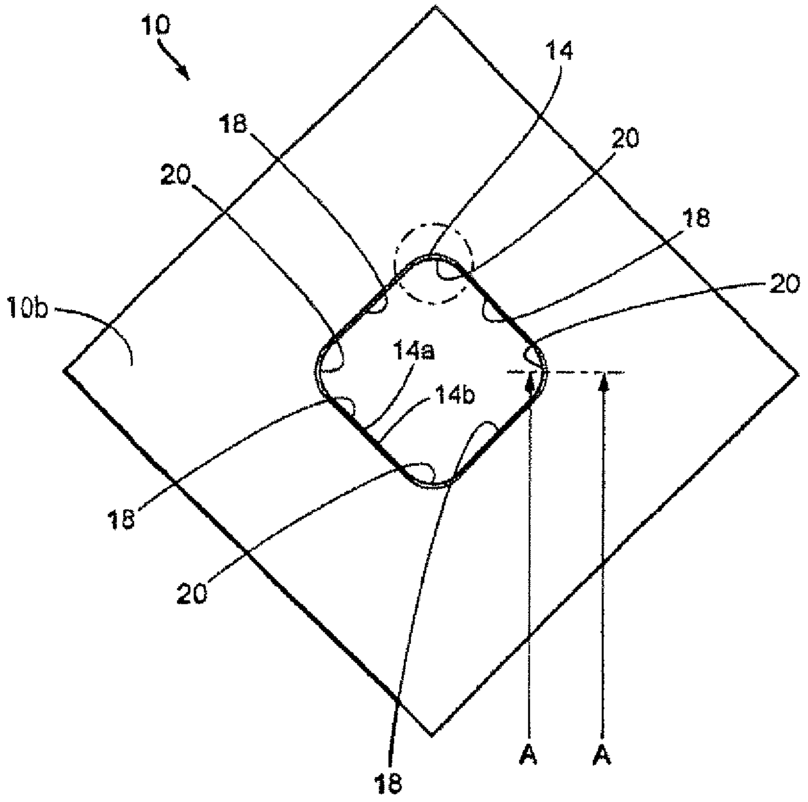
FIG. 6(*a*) presents a diagram illustrating the blank according to the embodiment of the present invention.
Figure 6B:
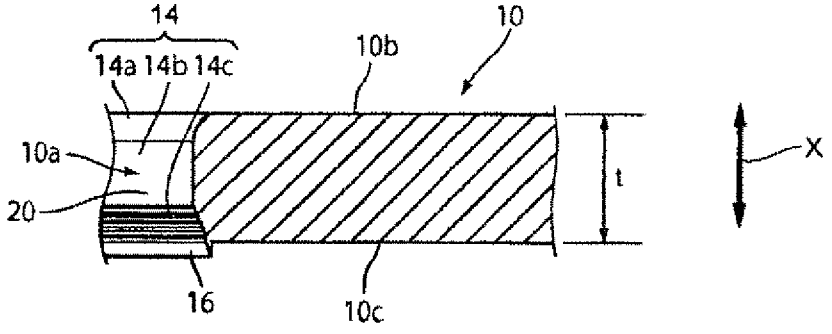

FIG. 6(*a*) is a plan view of the blank 10 and FIG. 6(*b*) is an enlarged cross-sectional view taken along line A-A in FIG. 6(*a*). In FIG. 6(*b*), the sheet thickness direction of the blank 10 is indicated by an arrow X. In the following description, the vertical direction of the blank 10 is defined as the sheet thickness direction of the blank 10.

Referring to FIGS. 6(*a*)-6(*b*), the blank 10 includes a front surface 10*b* and a back surface 10*c* that are approximately parallel to each other and extend perpendicular to the sheet thickness direction. The sheared edge 14 includes a shear droop portion 14*a*, a sheared surface 14*b*, and a fractured surface 14*c* positioned in this order from the front surface 10*b* side of the blank 10 in the sheet thickness direction. In the present embodiment, a burr 16 is formed on the back surface 10*c* side of the blank 10. In the present embodiment, the burr 16 is defined as a portion protruding downward from the back surface 10*c* of the blank 10. In the present embodiment, the sheared edge 14 is defined as a portion extending from the perimeter edge, on the front surface 10*b* side, of the hole 10*a* to the upper end of the burr 16. Thus, in the present embodiment, the length of the sheared edge 14 in the sheet thickness direction corresponds to a sheet thickness t of the blank 10 (the vertical distance between the front surface 10*b* and the back surface 10*c*).

Referring to FIG. 6(*a*), in plan view, the perimeter edge of the hole 10*a* (inner edge of the sheared edge 14) includes a plurality of straight portions 18 and a plurality of curved portions 20. In the present embodiment, the perimeter edge of the hole 10*a* (inner edge of the sheared edge 14) includes four straight portions 18 and four curved portions 20. In plan view, the curved portions 20 are located between the straight portions 18, and are concavely curved. In the present embodiment, the curved portions 20 are arcuately concavely curved. Referring to FIG. 5 and FIG. 6(*a*), each curved portion 20 is a portion that will stretch and deform during stretch flanging. The range of the curved portion is defined by assuming sites, in the curved portions, where the sign of the curvature changes or the curvature becomes zero to be boundaries. In other words, the two opposite ends of the concavely curved portion are the points where the sign of the curvature changes or the curvature becomes zero provided that the curvature of the inner edge of the sheared edge 14 is determined in plan view.

FIG. 7 is an enlarged plan view of the curved portion 20 (the portion encircled by the dashed line in FIG. 6(*a*)) of the blank 10. In FIG. 7, the perimeter direction of the sheared edge 14 is indicated by an arrow Y.

Referring to FIG. 6(*b*) and FIG. 7, in the blank 10, the average of lengths of the fractured surface 14*c* in the sheet thickness direction in the curved portion 20 is greater than the average of lengths of the fractured surface 14*c* in the sheet thickness direction over the entire perimeter of the sheared edge 14.

The average of lengths of the fractured surface 14*c* in the curved portion 20 in the sheet thickness direction is determined in the following manner. Firstly, the curved portion 20 is equally divided into five areas in the perimeter direction of the sheared edge 14. Then, the lengths of the fractured surface 14*c* in the sheet thickness direction are measured at the boundaries between adjacent areas. That is, in the curved portion 20, the length of the fractured surface 14*c* in the sheet thickness direction is measured at four points different in position in the perimeter direction of the sheared edge 14. Then, the average of the measured lengths at the four points is calculated and the result is designated as the average of lengths of the fractured surface 14*c* in the sheet thickness direction in the curved portion 20. The averages of lengths of the shear droop portion 14*a* and the sheared surface 14*b* in the sheet thickness direction in the curved portion 20 can be determined in the same manner.

The average of lengths of the fractured surface 14*c* in the sheet thickness direction over the entire perimeter of the sheared edge 14 is determined in the following manner. Firstly, the sheared edge 14 is equally divided into a plurality of areas with a predetermined width in the perimeter direction of the sheared edge 14. Then, the lengths of the fractured surface 14*c* in the sheet thickness direction are measured at the boundaries between adjacent areas. That is, the length of the fractured surface 14*c* in the sheet thickness direction is measured at a plurality of points different in position in the perimeter direction of the sheared edge 14. Then, the average of the measured lengths at the plurality of points is calculated and the result is designated as the average of lengths of the fractured surface 14*c* in the sheet thickness direction over the entire perimeter of the sheared edge 14. The predetermined width is set to be closest to the width of the five areas of the curved portion 20 when equally divided in the perimeter direction. The averages of lengths of the shear droop portion 14*a* and the sheared surface 14*b* in the sheet thickness direction over the entire perimeter of the sheared edge 14 can be determined in the same manner.

Referring to FIG. 7, a region R is a region extending a predetermined length in the perimeter direction of the sheared edge 14 with a reference point 22, which is defined as described below, being the center of the predetermined length. It is preferred that the average of lengths of the fractured surface 14*c* (see FIG. 6(*b*)) in the sheet thickness direction within the region R be greater than the average of lengths of the fractured surface 14*c* in the sheet thickness direction over the entire perimeter of the sheared edge 14. The reference point 22 is defined as the midpoint of the curved portion 20 in the perimeter direction of the sheared edge 14 or as the point where the curvature of the curved portion 20 in plan view is greatest. The predetermined length of the region R is a length of, for example, 50%, 100%, 1000%, or 2000% of the sheet thickness of the blank 10. Alternatively, for example, a region where points having a curvature of 5 $m^{-1}$ or more are continuous in the curved portion 20 may be designated as the region R having a predetermined length. In this case, the region R may be determined by measuring the curvature of the curved portion 20 using a radius gauge.

In the present embodiment, the average of lengths of the fractured surface 14*c* in the sheet thickness direction within the region R is greater than the average of lengths of the fractured surface 14*c* in the sheet thickness direction over the entire perimeter of the sheared edge 14, by 10% or more of the sheet thickness of the blank 10. Furthermore, in the present embodiment, the average of lengths of the shear droop portion 14*a* in the sheet thickness direction within the region R is 20% or less of the sheet thickness of the blank 10. The average of lengths of the fractured surface 14*c* in the sheet thickness direction within the region R is determined in the following manner. Firstly, the sheared edge 14 within the region R is equally divided into five areas in the perimeter direction. Then, the lengths of the fractured surface 14*c* in the sheet thickness direction are measured at the boundaries between adjacent areas. That is, in the region R, the length of the fractured surface 14*c* in the sheet thickness direction is measured at four points different in position in the perimeter direction of the sheared edge 14. Then, the average of the measured lengths at the four points is calculated and the result is designated as the average of lengths of the fractured surface 14*c* in the sheet thickness direction within the region R. The averages of lengths of the shear droop portion 14*a* and the sheared surface 14*b* in the sheet thickness direction within the region R can be determined in the same manner.

(Advantageous Effects of the Blank and Formed Article)

In the blank 10, the length of the fractured surface 14*c* in the sheet thickness direction is greater in the curved portion 20. In other words, in the portion, which tends to stretch and deform during press forming, the sheared surface 14*b* occupies a smaller fraction. With this configuration, the curved portion 20 can easily stretch and deform, and therefore, the occurrence of stretch flange cracking is suppressed at the curved portion 20 when the curved portion 20 is subjected to stretch flanging. Furthermore, in the areas other than the curved portion 20, the fractured surface 14*c* occupies a smaller fraction than in the curved portion 20. In other words, the sheared surface 14*b*, which is work hardened, occupies a larger fraction. As a result, sufficient fatigue strength is exhibited in the areas other than the curved portion 20. On the other hand, the fractured surface 14*c* occupies a larger fraction in the curved portion 20. Thus, in its condition before press forming, the curved portion 20 has reduced fatigue strength. However, during press forming, the curved portion 20 is work hardened by stretch flanging and therefore is increased in fatigue strength. As a result, the formed article 12 after press forming exhibits sufficient fatigue strength. As a result of these, the occurrence of stretch flange cracking is suppressed in production of the formed article 12 from the blank 10 while suppressing the decrease in fatigue strength of the formed article 12.

In the blank 10, for example, the average of lengths of the fractured surface 14*c* in the sheet thickness direction within the region R is set to be greater than the average of lengths of the fractured surface 14*c* in the sheet thickness direction over the entire perimeter of the sheared edge 14. This configuration suppresses the occurrence of stretch flange cracking at a central area (a positional center or an area where the curvature is large) of the curved portion 20.

In the blank 10, the average of lengths of the fractured surface 14*c* in the sheet thickness direction within the region R is greater than the average of lengths of the fractured surface 14*c* in the sheet thickness direction over the entire perimeter of the sheared edge 14, by 10% or more of the sheet thickness of the blank 10. This sufficiently suppresses the occurrence of stretch flange cracking at a central area of the curved portion 20.

In the blank 10, the average of lengths of the shear droop portion 14*a* in the sheet thickness direction within the region R is 20% or less of the sheet thickness of the blank 10. This suppresses the occurrence of stretch flange cracking more reliably.

In the blank 10, the predetermined length of the region R is set to a length of 50% of the sheet thickness of the blank 10, for example. This configuration more reliably suppresses the occurrence of stretch flange cracking at a central area of the curved portion 20. The predetermined length of the region R may be set to a length of 2000% of the sheet thickness of the blank 10, for example. This configuration suppresses the occurrence of stretch flange cracking over a sufficient range within the curved portion 20. Furthermore, the region R may be a region where the curvature is 5 $m^{-1}$ or more, for example. This configuration sufficiently prevents the occurrence of stretch flange cracking in the curved portion 20, where larger stretch flanging deformation occurs during press forming.

Although the blank 10 includes the plurality of curved portions 20, it suffices if one of the curved portions 20 satisfies the requirements of the present invention. Accordingly, there may be a curved portion(s) 20 that does not satisfy the requirements of the present invention among the plurality of curved portions 20.

(Die Assembly for Producing Blank and Method for Producing Blank)

In the following, a die assembly for producing the above blank 10 and a method for producing the blank 10 using the die assembly will be described.

FIG. 8 and FIG. 9 are schematic perspective views of a die assembly 24 according to an embodiment of the present invention. Referring to FIG. 8, the die assembly 24 includes a columnar punch 26 and a hollow die 28, which has a hole 28*a*. The hole 28*a* is configured to receive the punch 26. Referring to FIG. 8, when the above blank 10 is to be produced, firstly a metal sheet 30, which has a rectangular shape in plan view, is placed on the die 28. Referring to FIG. 8 and FIG. 9, subsequently the punch 26 is moved in the sheet thickness direction (direction indicated by an arrow Z in FIG. 8) of the metal sheet 30 to press a central portion of the metal sheet 30 inward by the punch 26 in such a manner that the lower end of the punch 26 is inserted in the hole 28*a*. Accordingly, the central portion of the metal sheet 30 is cut off (sheared off) to form the hole 10*a* (see FIG. 4). That is, the above blank 10 (see FIG. 4) is produced. The details will be described later. Hereinafter, the punch 26 and the die 28 will be described specifically. In the following description, the direction of movement of the punch 26 in shearing of the metal sheet 30 (direction indicated by the arrow Z) is designated as the vertical direction. Also, the direction perpendicular to the vertical direction is designated as the lateral direction.

Figure 10A:
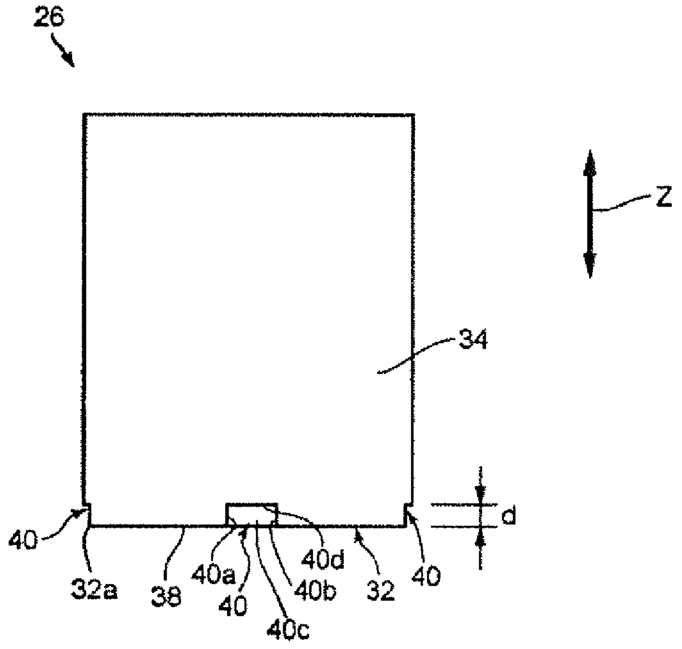
FIG. 10(*a*) is a side view of a punch.
Figure 10B:
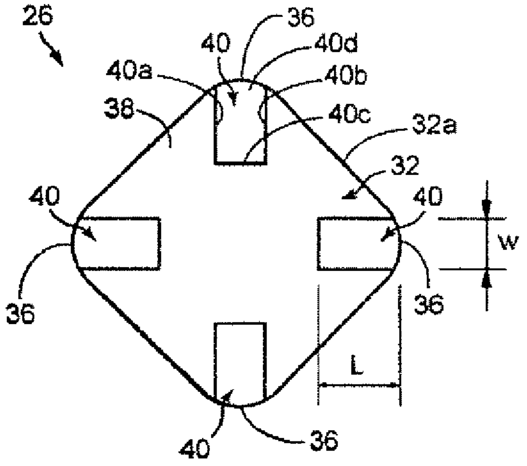

FIGS. 10(*a*)-(*b*) present schematic diagrams of the punch 26. FIG. 10(*a*) is a side view of the punch 26 and FIG. 10(*b*) is a bottom plan view of the punch 26.

Referring to FIG. 10(*a*), the punch 26 has a bottom surface 32 and an outer perimeter surface 34, which extends from an outer perimeter edge 32*a* of the bottom surface 32. In the punch 26, the outer perimeter edge 32*a* of the bottom surface 32 serves as the cutting edge. Accordingly, the outer perimeter edge 32*a* has an approximately rectangular shape in plan view as with the hole 10*a* so that the hole 10*a* (see FIG. 4) can be formed.

Referring to FIG. 10(*b*), the outer perimeter edge 32*a* of the bottom surface 32 includes a plurality of (four in the present embodiment) curved portions 36, which are convexly curved in bottom view (in plan view). In the present embodiment, the curved portions 36 are provided at the four respective corners of the approximately rectangular outer perimeter edge 32*a*.

Referring to FIGS. 10(*a*) and 10(*b*), the bottom surface 32 includes a planar portion 38 and a plurality of cutout portions 40, which are recessed upwardly (in a direction parallel to the direction of movement of the punch 26) with respect to the planar portion 38. Referring to FIG. 10(*a*), the cutout portions 40 have a rectangular shape in side view. More specifically, referring to FIGS. 10(*a*) and 10(*b*), the cutout portions 40 each include side walls 40*a*, 40*b*, 40*c*, which extend upwardly from the planar portion 38, and a ceiling 40*d*, which connects the upper edges of the side walls 40*a*, 40*b*, 40*c*. The side walls 40*a*, 40*b*, 40*c* are disposed in such a manner as to form an approximately U-shape in bottom view. In the present embodiment, each side wall 40*a* and each side wall 40*b* face each other, and each side wall 40*c* connects between one end of the side wall 40*a* and one end of the side wall 40*b*. The ceilings 40*d* are approximately parallel to the planar portion 38. Referring to FIG. 10(*b*), the cutout portions 40 are formed to include the center (apex) of the curved portions 36 in bottom view (in plan view).

Referring to FIG. 10(*a*), a cutout depth d of each cutout portion 40 is preferably set to 0.1 times or more the sheet thickness of the metal sheet 30 (see FIG. 9) and 0.7 times or less the sheet thickness. Referring to FIG. 10(*b*), a width w of the cutout portion 40 is appropriately set according to the dimensions of the curved portion 20 (see FIG. 6) of the blank 10 (see FIG. 6), but preferably, it is set to a size of 50 to 2000% of the sheet thickness of the metal sheet 30 and more preferably set to a size of 100 to 1000% of the sheet thickness. Furthermore, the die assembly 24 is preferably configured such that the centerline of the cutout portion 40 with respect to the width direction is positioned in alignment with the reference point 22 of the curved portion 20 of the blank 10 when the metal sheet 30 is to be cut. A length L of the cutout portion 40 is preferably equal to or greater than the sheet thickness of the metal sheet 30.

Referring to FIG. 8, the die 28 includes a hollow support surface 42 for supporting the metal sheet 30 and an inner perimeter surface 44, which extends downwardly from an inner perimeter edge 42*a* of the support surface 42. In the die 28, the inner perimeter edge 42*a* of the support surface 42 serves as the cutting edge. The inner perimeter edge 42*a* of the support surface 42 has a shape similar to the shape of the outer perimeter edge 32*a* of the bottom surface 32, and includes a plurality of curved portions 46, which correspond to the plurality of curved portions 36 of the outer perimeter edge 32*a*. The curved portions 46 have a concavely curved shape corresponding to the shape of the curved portions 36. The clearance between the punch 26 and the die 28 (i.e., the clearance between the outer perimeter edge 32*a* and the inner perimeter edge 42*a*) is set to, for example, a size of approximately 10% of the sheet thickness of the metal sheet 30.

Figure 11A:
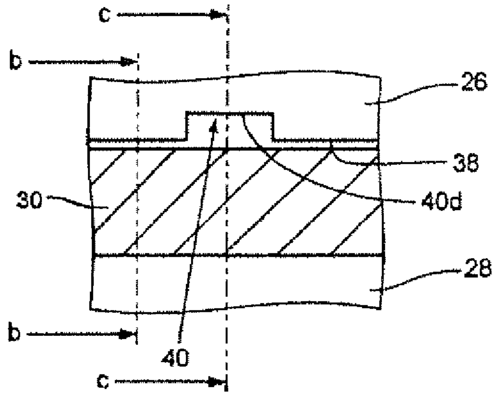
FIGS. 11(*a*)-11(*c*) present conceptual diagrams for illustrating one relationship between the punch, the die, and the metal sheet in the production of the blank.
Figure 11B:
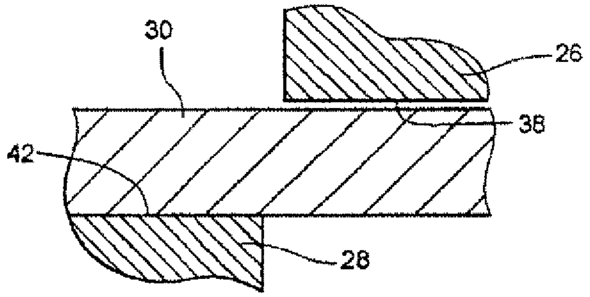
Figure 11C:
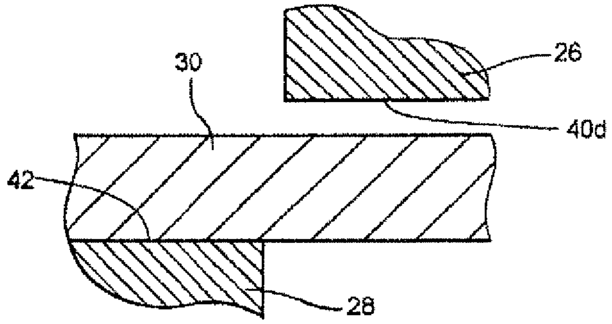

In the following, a method for producing the blank 10 using the above die assembly 24 will be described specifically with reference to the drawings. FIG. 11(*a*) to 15(*c*) are conceptual diagrams illustrating the relationships between the punch 26, the die 28, and the metal sheet 30 in the production of the blank 10. Specifically, in FIGS. 11(*a*) to 15(*c*), the figures labeled (a) are conceptual diagrams illustrating the relationships between the outer perimeter surface 34 (see FIG. 8) of the punch 26 in the vicinity of the curved portion 36 (see FIG. 8), the inner perimeter surface 44 (see FIG. 8) of the die 28 in the vicinity of the curved portion 46 (see FIG. 8), and the metal sheet 30, which is positioned between the curved portion 36 (see FIG. 8) and the curved portion 46 (see FIG. 8). In FIGS. 11(*a*) to 15(*c*), the figures labeled (b) are conceptual diagrams illustrating the relationships between the planar portion 38 of the punch 26, the support surface 42 of the die 28, and the metal sheet 30, which is positioned between the planar portion 38 and the support surface 42 (conceptual diagrams of the areas indicated by line b-b in FIG. 11(*a*)). In FIGS. 11(*a*) to 15(*c*), the figures labeled (c) are conceptual diagrams illustrating the relationships between the cutout portion 40 of the punch 26, the support surface 42 of the die 28, and the metal sheet 30, which is positioned between the cutout portion 40 and the support surface 42 (conceptual diagrams of the areas indicated by line c-c in FIG. 11(*a*)). In the figures labeled (a) in FIGS. 11(*a*) to 15(*c*), the metal sheet 30 is hatched to clarify the positional relationship.

Figure 12A:
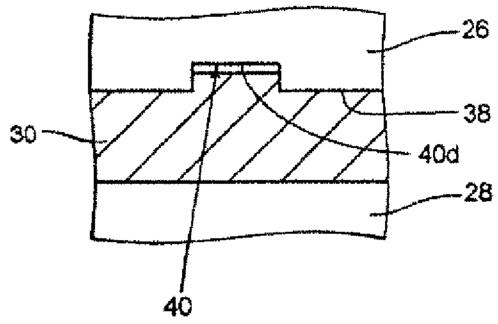
FIGS. 12(*a*)-12(*c*) present conceptual diagrams for illustrating another relationship between the punch, the die, and the metal sheet in the production of the blank.
Figure 12B:
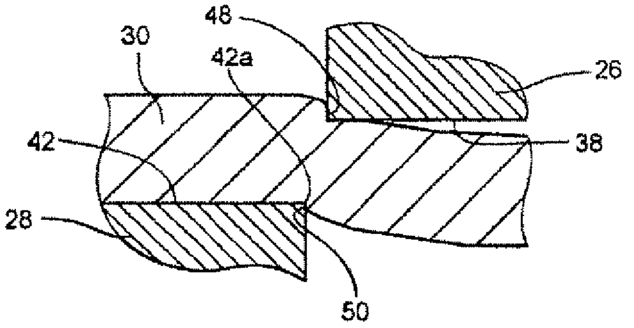
Figure 12C:
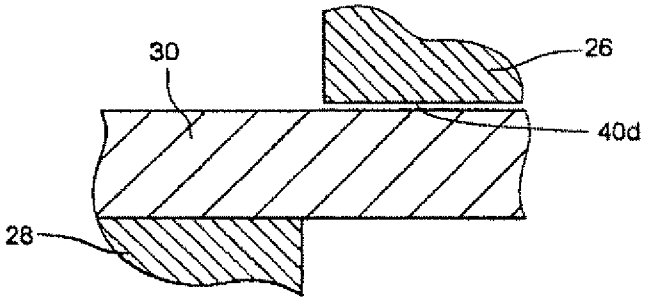

Referring to FIG. 8, when the blank 10 is to be produced, firstly the metal sheet 30 is placed on the support surface 42 of the die 28 as described above. Then, as illustrated in FIG. 11(*a*) and FIG. 12(*a*), the punch 26 is moved to force the planar portion 38 of the punch 26 into the metal sheet 30. Accordingly, a sheared surface 48 (see FIG. 12(*b*)) is formed on the front side of the metal sheet 30 by the outer edge of the planar portion 38. Furthermore, in the contact region between the die 28 and the back surface of the metal sheet 30, at the areas facing the outer edge of the planar portion 38, a sheared surface 50 is formed by the inner perimeter edge 42*a* of the support surface 42 of the die 28. As illustrated in FIGS. 12(*a*) and 12(*c*), while the amount of forcing of the punch 26 is still small, the ceilings 40*d* of the cutout portions 40 are not yet in contact with the metal sheet 30. Thus, in the metal sheet 30, at the areas facing the cutout portions 40, the sheared surface has not yet been formed. Also, in the contact region between the die 28 and the metal sheet 30, the area located below the cutout portion 40 has not yet received a large force, and therefore on the area as well, a sheared surface has not yet been formed.

Figure 13A:
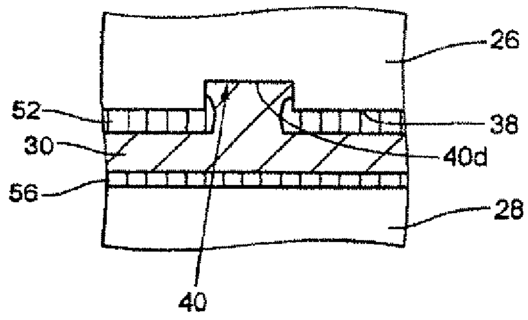
FIGS. 13(*a*)-13(*c*) present conceptual diagrams for illustrating yet another relationship between the punch, the die, and the metal sheet in the production of the blank.
Figure 13B:
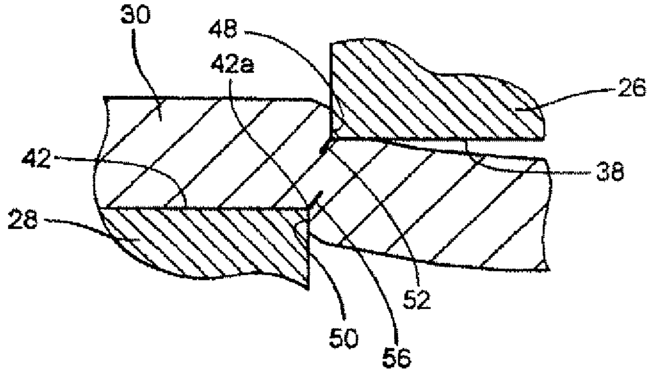
Figure 13C:
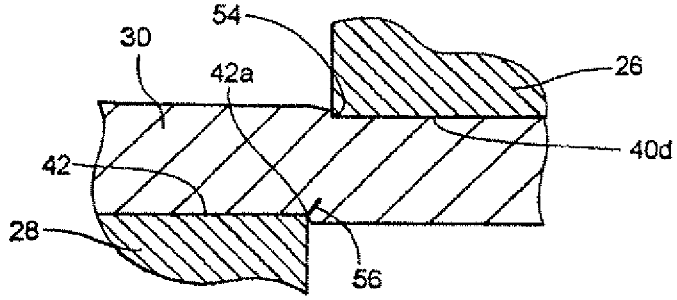

As illustrated in FIGS. 13(*a*) and 13(*b*), when the punch 26 is further forced inward, cracks 52 occur in the front surface of the metal sheet 30 in areas in contact with the outer edge of the planar portion 38. Also, as illustrated in FIGS. 13(*a*) and 13(*c*), the ceilings 40*d* of the cutout portions 40 come into contact with the front surface of the metal sheet 30. Accordingly, a sheared surface 54 is formed in the metal sheet 30 in the contact regions between the ceilings 40*d* and the metal sheet 30. Furthermore, as illustrated in FIGS. 13(*a*) to 13(*c*), cracks 56 occur in the metal sheet 30 in the contact regions between the inner perimeter edge 42*a* of the support surface 42 of the die 28 and the metal sheet 30.

Figure 14A:
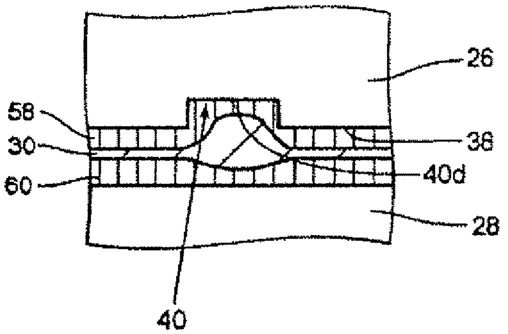
FIGS. 14(*a*)-14(*c*) present conceptual diagrams for illustrating still another relationship between the punch, the die, and the metal sheet in the production of the blank.
Figure 14B:
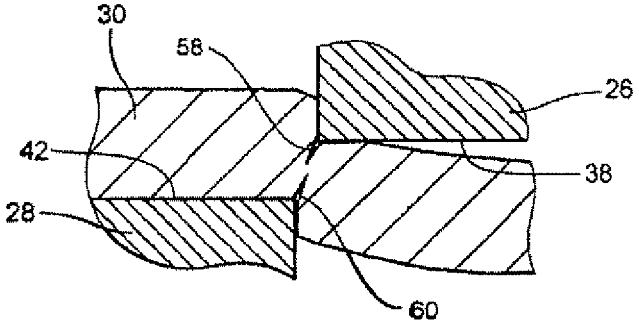
Figure 14C:
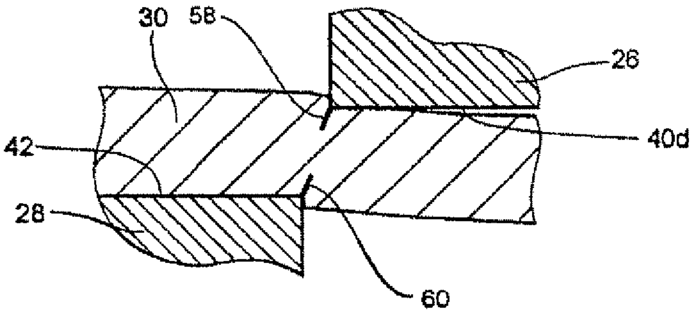
Figure 15A:
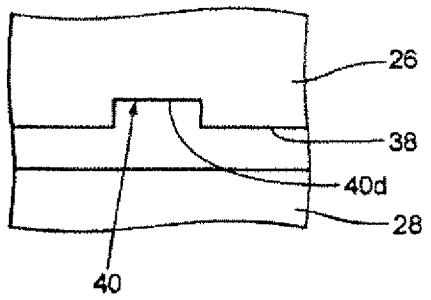
FIGS. 15(*a*)-(*c*) present conceptual diagrams for illustrating still yet another relationship between the punch, the die, and the metal sheet in the production of the blank.
Figure 15B:
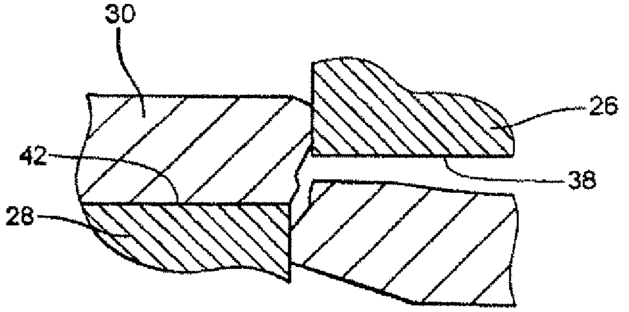
Figure 15C:
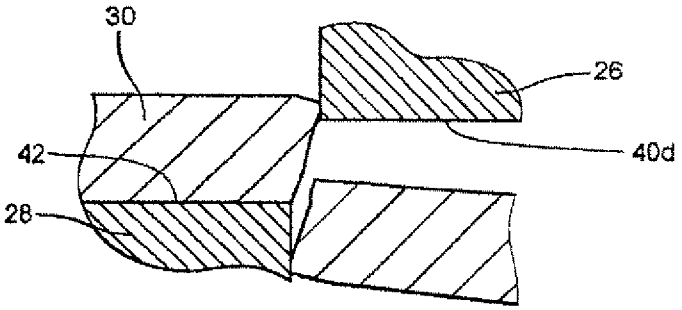
Figure 16A:
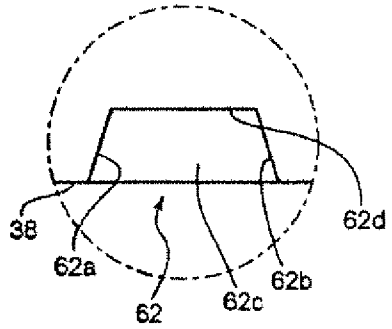
FIGS. 16(*a*)-16(*d*) present diagrams illustrating other configurations of a cutout portion.
Figure 16B:
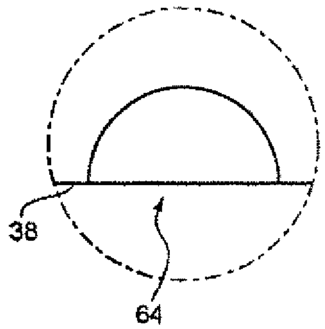
Figure 16C:
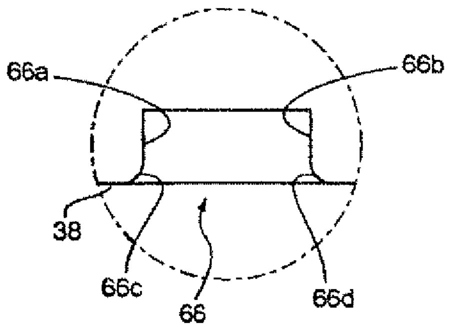
Figure 16D:
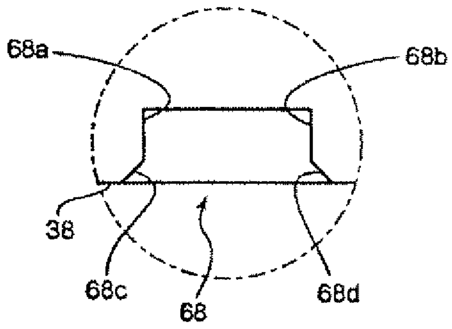

When the punch 26 is further forced inward, the cracks 52, 56 propagate in the sheet thickness direction of the metal sheet 30, so that fractured surfaces 58, 60 are formed on the front side and the back side of the metal sheet 30 as illustrated in FIGS. 14(*a*) and 14(*b*). As illustrated in FIGS. 14(*a*) and 14(*c*), cracks 52, 56 (see FIGS. 13(*b*)-(*c*)) propagate not only in the sheet thickness direction but also toward the contact regions between the metal sheet 30 and the cutout portions 40. As a result, fractured surfaces 58, 60 are also formed below the cutout portions 40. That is, before the cutout portions 40 are forced deeply into the metal sheet 30, the sufficiently large fractured surface 14*c* (see FIG. 6(*b*)) is formed in the areas located below the cutout portions 40 in the metal sheet 30. Finally, when the punch 26 is further forced inward as illustrated in FIGS. 15(*b*)-(*c*), the fractured surfaces 58, 60 propagate further so that a portion of the metal sheet 30 is cut off. In this manner, the blank 10 is produced.

(Advantageous Effects of Die Assembly and Production Method Using Die Assembly)

When the blank 10 is produced by the production method described above using the die assembly 24, the sufficiently large fractured surface 14*c* is formed in the areas located below the cutout portions 40 in the metal sheet 30 before the cutout portions 40 are forced deeply into the metal sheet 30. As a result, the lengths of the fractured surface 14*c* in the sheet thickness direction in the areas below the cutout portions 40 are greater than the lengths of the fractured surface 14*c* in the sheet thickness direction in the other areas. Thus, by cutting the areas that will undergo stretch flanging deformation during press forming via the cutout portions 40, stretch flange cracking is prevented. In addition, in the areas cut by the planar portion 38, the lengths of the fractured surface 14*c* in the sheet thickness direction are shorter, and therefore the decrease in fatigue strength is suppressed.

In the die assembly 24, the cutout depth of the cutout portions 40 is set to 0.1 times or more the sheet thickness of the metal sheet 30 and 0.7 times or less the sheet thickness, for example. This configuration makes it possible to appropriately delay the time at which the cutout portions 40 begin pressing the metal sheet 30 relative to the time at which the planar portion 38 begin pressing the metal sheet 30. As a result, in the areas cut by the cutout portions 40, the fractured surface 14*c* has appropriate lengths in the sheet thickness direction.

The die assembly 24 of the present invention can be produced merely by partially modifying the shape of the cutting edge (a portion corresponding to the outer perimeter edge 32*a* of the bottom surface 32) of conventional punches. As a result, the cost of die assembly production is reduced compared with the case in which a projection is provided in the punch (see for example Patent Document 1, described above). In addition, there is no need to consider the overall tool shape for shearing tools, which are of a variety of shapes, and therefore the die assembly is readily applicable to mass production facilities. Furthermore, when stretch flange cracking has occurred during press forming, a new cutout portion 40 can be added to the punch at a location corresponding to the location where the cracking occurred in the blank, by means such as an end mill. Thus, stretch flange cracking can be addressed on-site. In this regard as well, the die assembly is readily applicable to mass production facilities. The same applies to other punches to be described later and other dies including cutout portions to be described later.

It is preferred that sites that are prone to stretch flange cracking in the sheared edge of the blank be identified in advance by performing computation or conducting a stretch flanging test. Then, the die assembly may be configured to cut the identified sites by the cutout portions. This results in reduced costs of producing the die assembly and of processing the blank.

(Other Exemplary Die Assemblies)

Although, in the embodiment described above, the description refers to a case in which the punch 26 includes rectangular cutout portions 40 in side view, the shape of the cutout portions is not limited to the example described above. For example, the punch may include cutout portions 62, which have a trapezoidal shape in side view as illustrated in FIG. 16(*a*). The cutout portions 62 each include side walls 62*a*, 62*b*, 62*c* and a ceiling 62*d* as with the cutout portions 40. The side walls 62*a*, 62*b* are inclined such that the distance between them decreases toward the top in side view. Various studies by the present inventors reveal that the inclination angle of the side walls 62*a*, 62*b* with respect to a vertical plane is preferably not more than 30° in order to achieve efficient crack propagation by the cutout portions 62.

Alternatively, for example, the punch may include cutout portions 64, which have a semi-circular shape in side view as illustrated in FIG. 16(*b*). Alternatively, for example, the punch may include cutout portions 66, which have round corners 66*c*, 66*d* at boundaries between the planar portion 38 and side walls 66*a*, 66*b* as illustrated in FIG. 16(*c*). This configuration prevents damage at the boundaries between the cutout portions 66 and the planar portion 38. The radius of curvature of the radius corners 66*c*, 66*d* preferably ranges from 0.01 to 0.1 mm. Alternatively, for example, the punch may include cutout portions 68, which have beveled portions 68*c*, 68*d* at boundaries between the planar portion 38 and side walls 68*a*, 68*b* as illustrated in FIG. 16(*d*). This configuration also prevents damage at the boundaries between the cutout portions 68 and the planar portion 38.

In the embodiment described above, the description refers to the punch 26, which includes the plurality of cutout portions 40, but it is also possible to provide the cutout portions in the die instead of providing the cutout portions in the punch.

FIG. 17 is a schematic perspective view of a die assembly 24*a* according to another embodiment of the present invention. The die assembly 24*a* illustrated in FIG. 17 is different from the die assembly 24 illustrated in FIG. 8 in that a punch 70 is included in place of the punch 26 and a die 72 is included in place of the die 28.

The punch 70 is different from the punch 26 in that the plurality of cutout portions 40 (see FIG. 8) are not included. The die 72 is different from the die 28 in that the curved portions 46 include cutout portions 74, which have a shape similar to that of the cutout portions 40. Although not described in detail, in the case of using the die assembly 24*a* to produce the blank 10, advantageous effects similar to those of the case of using the above die assembly 24 to produce the blank 10 are achieved.

(Other Exemplary Blanks)

In the embodiment described above, the description refers to the blank 10, which has the hole 10*a* formed by punching, but the shape of the blank is not limited to the example described above. The present invention is also applicable to a blank in which a sheared edge is formed along the outer perimeter edge, e.g., a blank having a sheared edge formed by blanking along the outer perimeter edge.

FIG. 18 is a schematic perspective view of a blank according to another embodiment of the present invention. Referring to FIG. 18, a blank 76, which is sheet-shaped and elongate, has a shape such that the central portion in the longitudinal direction is narrower than the opposite end portions in the longitudinal direction. The blank 76 is produced by blanking for example and has a sheared edge 78 along the outer perimeter edge. The sheared edge 78 has a loop shape in plan view. In plan view, the outer edge of the sheared edge 78 includes a plurality of curved portions 80, which are concavely curved. Although not described in detail, the sheared edge 78 has a configuration similar to that of the sheared edge 14 of the blank 10 and the curved portions 80 have a configuration similar to that of the curved portions 20 of the blank 10. Thus, with the blank 76, advantageous effects similar to those of the above blank 10 are achieved.

Next, a die assembly for producing the above blank 76 will be described. FIG. 19 is a schematic perspective view of an exemplary die assembly for producing the blank 76. Referring to FIG. 19, the die assembly 82 includes a columnar punch 84 and a die 86, which has a hole 86*a*. The hole 86*a* is configured to receive the punch 84.

Referring to FIG. 19, the punch 84 includes a bottom surface 88 and an outer perimeter surface 90, which extends from an outer perimeter edge 88*a* of the bottom surface 88. In the punch 84, the outer perimeter edge 88*a* of the bottom surface 88 serves as the cutting edge. Accordingly, the outer perimeter edge 88*a* has a shape similar to that of the blank 76.

The outer perimeter edge 88*a* of the bottom surface 88 includes a plurality of (two in the present embodiment: only one curved portion 92 is illustrated in FIG. 19) curved portions 92, which are concavely curved in bottom view (in plan view). The bottom surface 88 includes a planar portion 94 and a plurality of (two in the present embodiment) cutout portions 96, which are recessed upwardly (in a direction parallel to the direction of movement of the punch 84) with respect to the planar portion 94, as with the above bottom surface 32 (see FIG. 10). Although not described in detail, the cutout portions 96 have a similar configuration to that of the above cutout portions 40, 62, 64, 66, or 68. The cutout portions 96 are formed to include the center (apex) of the curved portions 92 in bottom view (in plan view).

The die 86 includes a hollow support surface 98 for supporting the metal sheet (not illustrated) and an inner perimeter surface 100, which extends downwardly from an inner perimeter edge 98*a* of the support surface 98. In the die 86, the inner perimeter edge 98*a* of the support surface 98 serves as the cutting edge. The inner perimeter edge 98*a* of the support surface 98 has a shape similar to the shape of the outer perimeter edge 88*a* of the bottom surface 88, and includes a plurality of curved portions 102, which correspond to the plurality of curved portions 92 of the outer perimeter edge 88*a*. The curved portions 102 have a convexly curved shape corresponding to the shape of the curved portions 92. The clearance between the punch 84 and the die 86 is set to, for example, a size of approximately 10% of the sheet thickness of the metal sheet.

In the die assembly 82 as well, the punch 84 includes the cutout portions 96 as with the above punch 26. As a result, with the die assembly 82, advantageous effects similar to those of the above die assembly 24 are achieved. As with the die assembly 24*a* in FIG. 17, it is also possible to provide cutout portions in the curved portions 102 of the die 86 instead of providing the cutout portions 96 in the punch 84. This configuration produces advantageous effects similar to those of the die assembly 82.

EXAMPLE

In the following, the present invention will be described in more detail by way of examples, but the present invention is not limited to the examples described below.

First Example

Blanks for Examples 1 to 12 were produced by forming a hole in a 780 MPa class cold-rolled steel sheet of 1.6 mm sheet thickness (workpiece). The hole had a shape (30 mm×30 mm; the radius of curvature of the curved portions (radius corners) was 5 mm) similar to the shape of the hole 10*a* illustrated in FIG. 4. A punch illustrated in FIG. 8 was used (the shape of the cutout portions was rectangular. Opening width: 0 to 15 mm; length of cutout portion: 0 to entire punch bottom length; and corners, which are boundaries between the cutting edges and the cutout portions, had a roundness of R1.0). Furthermore, a blank for Comparative Example 1 was produced using a punch having a configuration similar to the punch of FIG. 8 except for the absence of cutout portions. Furthermore, a blank for Comparative Example 2 was produced using a punch disclosed in Patent Document 2. The clearance between the die and the punch was set to 10% of the sheet thickness of the workpiece.

The blanks produced in the above manner were subjected to burring using a truncated pyramid-shaped burring punch having a curved edge (not illustrated) to form a flange portion (burring portion) such as illustrated in FIG. 5 (burring test). In the burring test, the critical burring height at which cracking occurs in the sheared edge was measured to evaluate the stretch flanging properties.

To investigate the fatigue strength of the sheared portions, test specimens such as illustrated in FIG. 20 were cut and subjected to a plane bending fatigue test. The fatigue test specimens were cut by machining. The machined portions were subjected to grinding to increase the flatness. The sheared portions (portions corresponding to the holes formed by the punch) were not subjected to grinding. The maximum stress that could be applied to the outer layer of the test specimen (calculated from the bending moment) was used as the criterion, and the stress ratio was set to −1. The fatigue strength was evaluated by determining the stress at the failure limit at the point when ten million cycles of life was reached to be the fatigue limit.

Table 1 shows the configurations of the cutout portions of the punches used for punching and the results of the burring test. Table 2 shows the shear droop fraction, sheared surface fraction, and fractured surface fraction in the sheared edge at locations corresponding to stretch flanged areas and at locations not corresponding to the stretch flanged areas. It was assumed that portions (four corner portions) corresponding to the curved portions 20, which were described with reference to FIG. 7, were the stretch flanged areas. For reference, FIG. 21 and FIG. 22 show photographs of the exteriors of the sheared edges in stretch flanged areas of Comparative Example 1 and Example 5.

TABLE 1

| | Configuration of cutout portion | | | | |
|---|---|---|---|---|---|
| | Width/Sheet thickness (%) | Depth/Sheet thickness (%) | Length/Sheet thickness (%) | Burring height (mm) | Fatigue limit (MPa) |
| Example 1 | 75 | 9.4 | 44 | 6 | 310 |
| Example 2 | 313 | 12.5 | Entire length | 12 | 305 |
| Example 3 | 313 | 31.3 | Entire length | 16 | 305 |
| Example 4 | 313 | 50 | Entire length | 15 | 310 |
| Example 5 | 313 | 62.5 | Entire length | 17 | 315 |
| Example 6 | 625 | 62.5 | Entire length | 17 | 305 |
| Example 7 | 938 | 62.5 | Entire length | 16 | 310 |
| Example 8 | 313 | 62.5 | 62.5 | 15 | 310 |
| Example 9 | 313 | 62.5 | 187.5 | 16 | 310 |
| Example 10 | 313 | 62.5 | 625 | 16 | 310 |
| Example 11 | 1875 | 62.5 | Entire length | 13 | 305 |
| Example 12 | 313 | 62.5 | 18.8 | 14 | 310 |
| Comparative Example 1 | — | — | — | 9 | 310 |
| Comparative Example 2 | — | — | — | 12 | 270 |

TABLE 2

| | Sheared edge shape of stretch flanged area | | | Sheared edge shape of non-stretch flanged area | | | Difference in |
|---|---|---|---|---|---|---|---|
| | Shear droop fraction (%) | Sheared surface fraction (%) | Fractured surface fraction (%) | Shear droop fraction (%) | Sheared surface fraction (%) | Fractured surface fraction (%) | fractured surface fraction (%) |
| Example 1 | 7.2 | 33.6 | 59.2 | 6.4 | 36.8 | 56.8 | 2.4 |
| Example 2 | 7.36 | 25.6 | 67.04 | 6.4 | 36.8 | 56.8 | 10.24 |
| Example 3 | 7.44 | 24 | 68.56 | 6.4 | 36.8 | 56.8 | 11.76 |
| Example 4 | 7.6 | 14.4 | 78 | 6.4 | 36.8 | 56.8 | 21.2 |
| Example 5 | 7.68 | 12.8 | 79.52 | 6.4 | 36.8 | 36.8 | 22.72 |
| Example 6 | 7.68 | 16.8 | 75.52 | 6.56 | 35.2 | 58.24 | 17.28 |
| Example 7 | 7.84 | 18.4 | 73.76 | 6.56 | 35.2 | 58.24 | 15.52 |
| Example 8 | 7.6 | 17.6 | 74.8 | 6.56 | 36 | 57.44 | 17.36 |
| Example 9 | 7.68 | 17.6 | 74.72 | 6.56 | 36 | 57.44 | 17.28 |
| Example 10 | 7.68 | 17.6 | 74.72 | 6.56 | 36 | 57.44 | 17.28 |
| Example 11 | 8 | 20 | 72 | 6.56 | 36 | 57.44 | 14.56 |
| Example 12 | 7.52 | 22.4 | 70.08 | 6.56 | 36 | 37.44 | 12.64 |
| Comparative Example 1 | 6.56 | 36 | 57.44 | 6.56 | 36 | 57.44 | 0 |
| Comparative Example 2 | 7.2 | 28 | 64.8 | 7.2 | 28 | 64.8 | 0 |

The results of the burring test indicate that the blanks of Examples 2 to 12, in which the cutout depths of the cutout portions constitute a fraction (%) within a range of 10 to 70% of the sheet thickness of the blank, achieved larger burring heights than the blank of Comparative Example 1. Furthermore, the blank of Comparative Example 2, in which the fractured surface fraction was increased over the entire perimeter of the sheared edge, had cracks in the sheared edge at areas other than the stretch flanged areas and therefore exhibited a decreased fatigue strength. On the other hand, the blanks of Examples 1 to 12 did not have cracks also at areas other than the stretch flanged areas and therefore did not have a decrease in fatigue strength.

Although, in First Example, a 780 MPa class cold-rolled steel sheet of 1.6 mm sheet thickness was used, the present inventors empirically have found that other steel sheets having different thicknesses or strengths, when used, can achieve similar advantageous effects.

Second Example

Blanks for Examples 1 to 12 having a shape similar to that of the blank 76 illustrated in FIG. 18 were produced by shearing a 590 MPa class cold-rolled steel sheet of 1.6 mm sheet thickness (workpiece) using a punch 84 illustrated in FIG. 19. Furthermore, a blank for Comparative Example 1 was produced using a punch having a configuration similar to that of the punch 84 in FIG. 19 except for the absence of cutout portions. The clearance between the die and the punch was set to 10% of the sheet thickness of the workpiece.

Figure 23A:
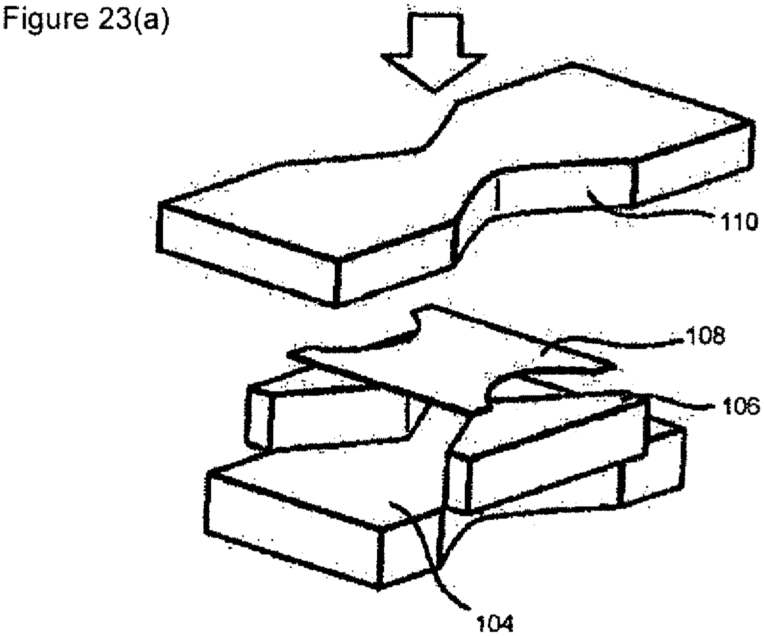
FIG. 23(*a*) illustrates how the stretch flanging test was conducted.
Figure 23B:
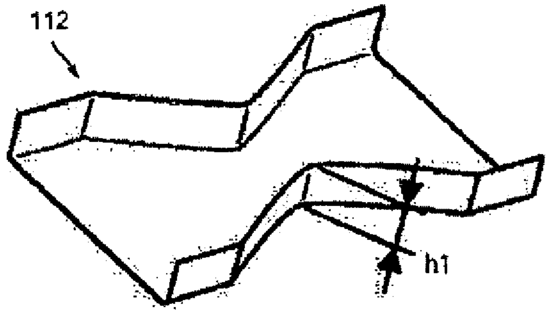

FIG. 23(*a*) illustrates how the stretch flanging test was conducted and FIG. 23(*b*) illustrates the shape of a stretch flanged article. As illustrated in FIG. 23(*a*), in the stretch flanging test, a blank 108 was placed on a die 106 supported on a pad 104. Then, flanging was performed by pressing the blank 108 by a punch 110 to produce a stretch flanged article 112 illustrated in FIG. 23(*b*).

The stretch flanging test was conducted under various conditions including different stretch flange heights h1 (5 mm, 10 mm, 15 mm, 20 mm, and 25 mm), i.e., under five conditions that are different from each other in the amount of plastic deformation in the sheared edge resulting from the stretch flanging test.

Table 3 shows the configurations of the cutout portions of the punches used for shearing and the results of the stretch flanging test. Table 4 shows the shear droop fraction, sheared surface fraction, and fractured surface fraction in the sheared edge at locations corresponding to the stretch flanged areas and at locations not corresponding to the stretch flanged areas.

TABLE 3

| | Configuration of cutout portion | | | |
|---|---|---|---|---|
| | Width/Sheet thickness (%) | Depth/Sheet thickness (%) | Length/Sheet thickness (%) | Stretch flange height (mm) |
| Example 1 | 75 | 9.4 | 44 | 10 |
| Example 2 | 313 | 12.5 | Entire length | 15 |
| Example 3 | 313 | 31.3 | Entire length | 20 |
| Example 4 | 313 | 50 | Entire length | 20 |
| Example 5 | 313 | 62.5 | Entire length | 25 |
| Example 6 | 625 | 62.5 | Entire length | 20 |
| Example 7 | 938 | 62.5 | Entire length | 25 |
| Example 8 | 313 | 62.5 | 62.5 | 20 |
| Example 9 | 313 | 62.5 | 187.5 | 25 |
| Example 10 | 313 | 62.5 | 625 | 25 |
| Example 11 | 1875 | 62.5 | Entire length | 15 |
| Example 12 | 313 | 62.5 | 18.8 | 15 |
| Comparative Example 1 | — | — | — | 10 |

TABLE 4

| | Sheared edge shape of stretch flanged area | | | Sheared edge shape of non-stretch flanged area | | | Difference in fractured surface fraction (%) |
|---|---|---|---|---|---|---|---|
| | Shear droop fraction (%) | Sheared surface fraction (%) | Fractured surface fraction (%) | Shear droop fraction (%) | Sheared surface fraction (%) | Fractured surface fraction (%) | |
| Example 1 | 12 | 58 | 50 | 14 | 42 | 44 | 6 |
| Example 2 | 13 | 30 | 57 | 14 | 42 | 44 | 13 |
| Example 3 | 13 | 27 | 60 | 14 | 42 | 44 | 16 |
| Example 4 | 14 | 26 | 60 | 14 | 42 | 44 | 16 |
| Example 5 | 15 | 18 | 67 | 14 | 42 | 44 | 23 |
| Example 6 | 15 | 22 | 63 | 14 | 42 | 44 | 19 |
| Example 7 | 15 | 17 | 68 | 14 | 42 | 44 | 24 |
| Example 8 | 14 | 20 | 66 | 14 | 42 | 44 | 22 |
| Example 9 | 15 | 18 | 67 | 14 | 42 | 44 | 23 |
| Example 10 | 15 | 18 | 67 | 14 | 42 | 44 | 23 |
| Example 11 | 15 | 27 | 58 | 14 | 42 | 44 | 14 |
| Example 12 | 12 | 28 | 60 | 14 | 42 | 44 | 16 |
| Comparative Example 1 | 14 | 42 | 44 | 14 | 42 | 44 | 0 |

The results of the stretch flanging test indicate that the blanks of Examples 1 to 12 did not have stretch flange cracking in the sheared edges. In contrast, the blank of Comparative Example 1 had stretch flange cracking.

INDUSTRIAL APPLICABILITY

The present invention provides a shearing method which achieves a reduction in the cost of producing the tool, which is readily applicable to mass production facilities, and which suppresses stretch flange cracking in the sheared edge. Thus, the present invention finds high applicability in the steel processing industry.

The invention claimed is:

1. A die assembly comprising:

a columnar punch; and a hollow die configured to receive the punch, the die assembly being configured to shear a metal sheet placed on the die by moving the punch in a predetermined direction, the die comprising a support surface and an inner perimeter surface, the support surface being configured to support the metal sheet and comprising a cutting edge constituted by an inner perimeter edge of the die, the inner perimeter surface extending from the inner perimeter edge in a direction parallel to the predetermined direction, the inner perimeter edge comprising, in plan view, a pair of straight portions and a corner located between the pair of straight portions, the corner having a curved portion, the curved portion being a curved portion that is convexly curved or concavely curved, the support surface comprising a planar portion and a cutout portion, the cutout portion recessed with respect to the planar portion in the predetermined direction and configured to comprise the curved portion in plan view; and wherein the cutting edge is included in the planar portion and the cutout portion, the cutting edge of the cutout portion with the curved portion thereof being recessed below the cutting edge of the planar portion.

2. A method for producing a blank for press forming, the method using the die assembly according to claim 1, the method comprising the steps of:

placing a metal sheet on the die of the die assembly, and shearing the metal sheet on the die using the punch of the die assembly.

3. A method for producing a blank comprising:

a sheared edge comprising, in a sheet thickness direction, a sheared surface and a fractured surface, wherein the sheared edge has a loop shape in plan view, the sheared edge has an edge comprising, in plan view, a curved portion that is concavely curved, and an average of lengths of the fractured surface in the sheet thickness direction in the curved portion is greater than an average of lengths of the fractured surface in the sheet thickness direction over an entire perimeter of the sheared edge, the method using the die assembly according to claim 1, the method comprising the steps of:

placing a metal sheet on the die of the die assembly, and shearing the metal sheet on the die using the punch of the die assembly, wherein, in the step of shearing, at least a portion of the curved portion of the blank is formed by cutting a portion of the metal sheet via the cutout portion of the die.

* * * * *